United States Patent
Kim et al.

(10) Patent No.: US 11,696,165 B2
(45) Date of Patent: *Jul. 4, 2023

(54) TRANSMITTING AND RECEIVING POWER MEASUREMENT INFORMATION RELATED TO BEAM REPORTING IN A WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,843

(22) Filed: Jan. 20, 2022

(65) Prior Publication Data

US 2022/0174532 A1 Jun. 2, 2022

Related U.S. Application Data

(63) Continuation of application No. 17/061,064, filed on Oct. 1, 2020, now Pat. No. 11,284,286, which is a
(Continued)

(30) Foreign Application Priority Data

Sep. 21, 2018 (KR) .......... 10-2018-0114467
Sep. 28, 2018 (KR) .......... 10-2018-0116598

(51) Int. Cl.
*H04W 24/10* (2009.01)
*H04L 5/00* (2006.01)
*H04W 72/23* (2023.01)

(52) U.S. Cl.
CPC .......... *H04W 24/10* (2013.01); *H04L 5/0048* (2013.01); *H04W 72/23* (2023.01)

(58) Field of Classification Search
CPC . H04W 24/10; H04W 72/042; H04W 72/082; H04W 88/02; H04L 5/0048;
(Continued)

(56) References Cited

U.S. PATENT DOCUMENTS

2013/0322376 A1 12/2013 Marinier et al.
2013/0336214 A1 12/2013 Sayana et al.
(Continued)

FOREIGN PATENT DOCUMENTS

CA 3053235 8/2018
CN 107079323 8/2017
(Continued)

OTHER PUBLICATIONS

Ericsson, "Feature lead summary on beam measurement and reporting," R1-1805514, 3GPP TSG RAN WG1 Meeting #92b, Sanya, China, dated Apr. 16-20, 2018, 25 pages.
(Continued)

*Primary Examiner* — Mewale A Ambaye
(74) *Attorney, Agent, or Firm* — Fish & Richardson P.C.

(57) ABSTRACT

A method of transmitting, by a user equipment (UE), power measurement information related to beam reporting in a wireless communication system includes: receiving downlink control information (DCI) triggering reporting of the power measurement information; receiving a downlink reference signal for reporting of the power measurement information; and transmitting, to a base station, power measurement information determined based on the received downlink reference signal. A minimum required time for reporting of the power measurement information is (i) calculated as the sum of a first minimum required time from the last timing of the downlink reference signal to a transmission timing of the power measurement information and a second minimum required time between DCI triggering
(Continued)

the downlink reference signal and reception of the downlink reference signal or (ii) calculated based on a pre-configured threshold value related to reporting of the power measurement information.

20 Claims, 10 Drawing Sheets

Related U.S. Application Data continuation of application No. 16/886,990, filed on May 29, 2020, now Pat. No. 10,834,624, which is a continuation of application No. 16/790,126, filed on Feb. 13, 2020, now Pat. No. 10,785,669, which is a continuation of application No. PCT/KR2019/010629, filed on Aug. 21, 2019.

(60) Provisional application No. 62/742,337, filed on Oct. 6, 2018, provisional application No. 62/720,865, filed on Aug. 21, 2018.

(58) Field of Classification Search
CPC ... H04L 1/0026; H04L 1/0028; H04L 1/0077; H04B 7/024; H04B 7/0626; H04B 7/0632; H04B 7/066
See application file for complete search history.

(56) References Cited

U.S. PATENT DOCUMENTS

| | | | |
|---|---|---|---|
| 2014/0010126 A1 | 1/2014 | Sayana et al. | |
| 2017/0208568 A1 | 7/2017 | Nam et al. | |
| 2018/0092129 A1* | 3/2018 | Guo | H04W 56/0005 |
| 2018/0212800 A1 | 7/2018 | Park et al. | |
| 2018/0227156 A1 | 8/2018 | Papasakellariou | |
| 2018/0278392 A1* | 9/2018 | Onggosanusi | H04L 5/0048 |
| 2018/0287682 A1* | 10/2018 | Kwak | H04W 24/10 |
| 2018/0368142 A1 | 12/2018 | Lion | |
| 2019/0053089 A1 | 2/2019 | Kwak et al. | |
| 2019/0090258 A1 | 3/2019 | Ryu et al. | |
| 2019/0098523 A1 | 3/2019 | Muruganathan et al. | |
| 2019/0165847 A1* | 5/2019 | Kim | H04L 25/0224 |
| 2019/0165971 A1* | 5/2019 | Manolakos | H04L 5/0091 |
| 2019/0261424 A1* | 8/2019 | Park | H04W 74/006 |
| 2019/0319739 A1* | 10/2019 | Kang | H04B 7/0456 |
| 2019/0379494 A1* | 12/2019 | Kakishima | H04L 5/0053 |
| 2021/0167512 A1* | 6/2021 | Lee | H01Q 3/30 |

FOREIGN PATENT DOCUMENTS

| | | |
|---|---|---|
| KR | 1020130077815 | 7/2013 |
| KR | 1020140012699 | 2/2014 |
| KR | 1020170027317 | 3/2017 |
| WO | WO2012061770 | 5/2012 |
| WO | WO 2017/026794 | 2/2017 |
| WO | WO2017151876 | 9/2017 |
| WO | WO2018021815 | 2/2018 |
| WO | WO2018085601 | 5/2018 |

OTHER PUBLICATIONS

ETSI, "5G; NR; Physical layer procedures for data," 3GPP TS 38.214 version 15.2.0 Release 15, ETSI TS 138 214 V15.2.0, dated Jul. 2018, 95 pages.
Extended European Search Report in European Application No. 19851001.8, dated Apr. 21, 2020, 11 pages.
Korean Notice of Allowance in Korean Application No. 10-2020-0097967, dated Dec. 12, 2020, 4 pages (with Machine translation).
LG Electronics, "Discussion on CSI framework," R1-1710284, 3GPP TSG RAN WG1 NR Ad-Hoc#2, Qingdao, P.R. China, dated Jun. 27-30, 2017, 7 pages.
LG Electronics, "Remaining issues on CSI reporting," R1-1804543, 3GPP TSG RAN WG1 Meeting #92bis, Sanya, China, dated Apr. 16-20, 2018, 12 pages.
LG Electronics, "Remaining issues on CSI reporting," R1-1806609, 3GPP TSG RAN WG1 Meeting #93, Busan, Korea, dated May 21-25, 2018, 11 pages.
LG Electronics, "Text proposals on CSI acquisition," R1-1808486, 3GPP TSG RAN WG1 Meeting #94, Gothenburg, Sweden, dated Aug. 20-24, 2018, 6 pages.
PCT International Search Report in International Application No. PCT/KR2019/010629, dated Dec. 12, 2019, 7 pages (with Machine translation).
Qualcomm Incorporated, "Maintenance for CSI Acquisition," R1-1809501, 3GPP TSG RAN WG1 Meeting #94, Gothenburg, Sweden, dated Aug. 20-24, 2018, 10 pages.
Office Action in Chinese Appln. No. 201980004744.1, dated Nov. 8, 2022, 28 pages (with English translation).

* cited by examiner

TRANSMITTING AND RECEIVING POWER MEASUREMENT INFORMATION RELATED TO BEAM REPORTING IN A WIRELESS COMMUNICATION SYSTEM

CROSS-REFERENCE TO RELATED APPLICATIONS

This application is a continuation application of U.S. application Ser. No. 17/061,064 filed on Oct. 1, 2020, which is a continuation application of U.S. application Ser. No. 16/886,990, filed on May 29, 2020, which is a continuation application of U.S. application Ser. No. 16/790,126, filed on Feb. 13, 2020, which is a continuation application of International Application No. PCT/KR2019/010629, filed on Aug. 21, 2019, which claims the benefit of U.S. Provisional Application No. 62/720,865, filed on Aug. 21, 2018, KR Application No. 10-2018-0114467, filed on Sep. 21, 2018, KR Application No. 10-2018-0116598, filed on Sep. 28, 2018, and U.S. Provisional Application No. 62/742,337, filed on Oct. 6, 2018. The contents of the prior applications are all hereby incorporated by reference herein in their entirety.

TECHNICAL FIELD

The present disclosure generally relates to a wireless communication system and, more particularly, to transmitting and receiving channel state information.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer from resource shortages and increased user demand for even higher-speed services, development of more advanced mobile communication systems is needed.

The requirements of the next-generation mobile communication system may include supporting increased data traffic, an increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

Implementations of the present disclosure enable transmitting and receiving channel state information (CSI).

In one aspect of the disclosure, a method of transmitting, by a UE, power measurement information related to beam reporting in a wireless communication system may include: receiving downlink control information (DCI) which triggers reporting of the power measurement information; receiving a downlink reference signal for reporting of the power measurement information; and transmitting power measurement information determined on the basis of the received downlink reference signal to a base station. A minimum required time for reporting of the power measurement information is (i) calculated as the sum of a first minimum required time from the last timing of the downlink reference signal to a transmission timing of the power measurement information and a second minimum required time between DCI triggering the downlink reference signal and reception of the downlink reference signal or (ii) calculated based on a pre-configured threshold value related to reporting of the power measurement information.

Further, in the method according to one aspect of the disclosure, the reporting of the power measurement information includes any one of (i) a CSI-RS resource indicator (CRI) and reference signal received power (RSRP)), (ii) a synchronization signal block (SSB) identifier and RSRP and (iii) no report.

Further, in the method according to one aspect of the disclosure, when the sum of the first minimum required time and the second minimum required time is greater than a specific value, the minimum required time for the reporting of the power measurement information is calculated based on a pre-configured threshold value related to the reporting of the power measurement information.

Further, in the method according to one aspect of the disclosure, information for the second minimum required time is reported, by the UE, to the base station as UE capability information.

Further, in the method according to one aspect of the disclosure, the downlink reference signal is at last one of a channel state information-reference signal (CSI-RS) and a synchronization signal block.

Further, in the method according to one aspect of the disclosure, a subcarrier spacing for the reporting of the power measurement information is 60 kHz or 120 kHz.

Further, in the method according to one aspect of the disclosure, the number of CSI processing units used for the reporting the power measurement information is 1.

In another aspect of the disclosure, a UE transmitting power measurement information related to beam reporting in a wireless communication system may include: a radio frequency (RF) unit; at least one processor; and at least one memory functionally connected to the at least one processor. The at least one memory may store instructions that, when executed by the at least one processor, perform operations comprising: receiving downlink control information (DCI) triggering reporting of the power measurement information, through the RF unit; receiving a downlink reference signal for reporting of the power measurement information, through the RF unit; and transmitting, to a base station, power measurement information determined based on the received downlink reference signal, through the RF unit, A minimum required time for reporting of the power measurement information is (i) calculated as the sum of a first minimum required time from the last timing of the downlink reference signal to a transmission timing of the power measurement information and a second minimum required time between DCI triggering the downlink reference signal and reception of the downlink reference signal or (ii) calculated based on a pre-configured threshold value related to reporting of the power measurement information.

Further, in the UE according to another aspect of the disclosure, the reporting of the power measurement information includes any one of (i) a CSI-RS resource indicator (CRI) and reference signal received power (RSRP)), (ii) a synchronization signal block (SSB) identifier and RSRP and (iii) no report.

Further, in the UE according to another aspect of the disclosure, when the sum of the first minimum required time and the second minimum required time is greater than a specific value, the minimum required time for the reporting of the power measurement information is calculated based on a pre-configured threshold value related to the reporting of the power measurement information.

Further, in the UE according to another aspect of the disclosure, information for the second minimum required time is reported, by the UE, to the base station as UE capability information.

Further, in the UE according to another aspect of the disclosure, the downlink reference signal is at last one of a channel state information-reference signal (CSI-RS) and a synchronization signal block.

Further, in the UE according to another aspect of the disclosure, a subcarrier spacing for the reporting of the power measurement information is 60 kHz or 120 kHz.

Further, in the UE according to another aspect of the disclosure, the number of CSI processing units used for the reporting the power measurement information is 1.

In another aspect of the disclosure, a base station receiving power measurement information related to beam reporting in a wireless communication system may include: a radio frequency (RF) unit; at least one processor; and at least one memory functionally connected to the at least one processor. The at least one memory may stores instructions that, when executed by the at least one processor, perform operations comprising: transmitting downlink control information (DCI) triggering reporting of the power measurement information, through the RF unit; transmitting a downlink reference signal for reporting of the power measurement information, through the RF unit; and receiving, from a user equipment, power measurement information determined based on the received downlink reference signal, through the RF unit. A minimum required time for reporting of the power measurement information is (i) calculated as the sum of a first minimum required time from the last timing of the downlink reference signal to a transmission timing of the power measurement information and a second minimum required time between DCI triggering the downlink reference signal and reception of the downlink reference signal or (ii) calculated based on a pre-configured threshold value related to reporting of the power measurement information.

According to some implementations of the present disclosure, there is an effect in that CSI calculation and CSI reporting can be efficiently performed when the number of processing units utilized by a terminal for CSI reporting is smaller than the number of CSI reportings that are configured and/or indicated by a base station in CSI reporting.

Furthermore, according to some implementations of the present disclosure, there is an effect that an efficient Z value setting and efficient processing unit utilization can be realized in the case of L1-RSRP report used for beam management and/or beam reporting use, in addition to normal CSI reporting.

Furthermore, according to implementations of the present disclosure, there is an effect that delay in L1-RSRP reporting can be reduced or complexity of implementation of a terminal related to L1-RSRP reporting can be decreased in efficient selection of a minimum required time related to L1-RSRP reporting.

Effects which may be obtained by the present disclosure are not limited to the above-described effects, and various other effects may be evidently understood by those skilled in the art to which the present disclosure pertains from the following description.

MODE FOR INVENTION

Figure 1:
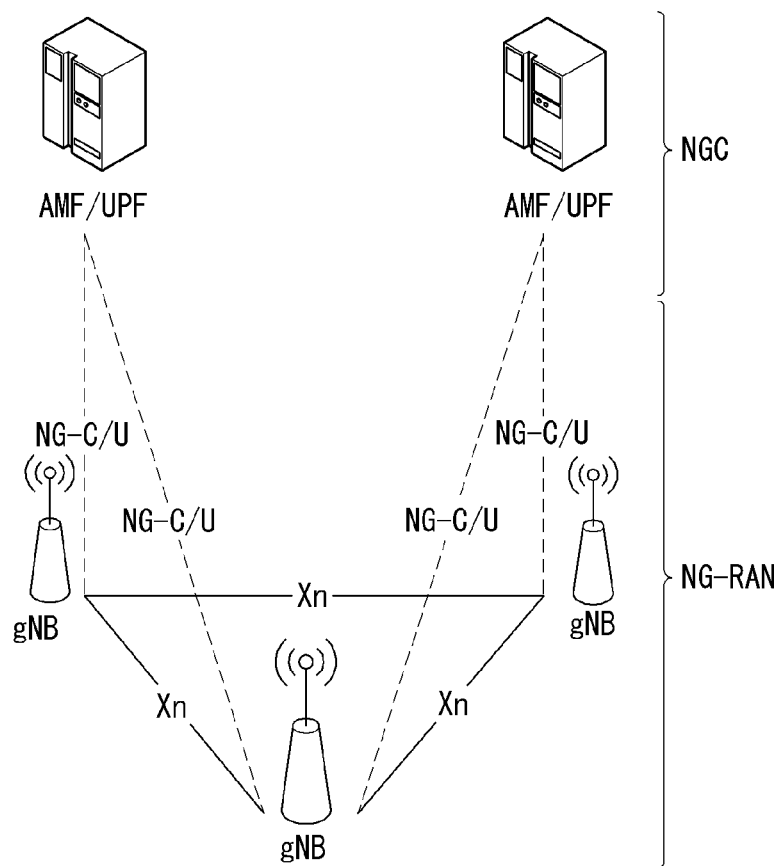
FIG. 1 is a diagram illustrating an example of an overall structure of a new radio (NR) system according to some implementations of the present disclosure.

Implementations of the present disclosure generally enable transmitting and receiving channel state information (CSI) in a wireless communication system.

According to some implementations, techniques are disclosed for allocating and/or assigning one or more CSI reportings, configured and/or indicated by a base station, to one or more processing units that are utilized by a corresponding terminal when the terminal calculates CSI.

Furthermore, according to some implementations, techniques are disclosed for allocating and/or assigning a minimum required time (e.g., Z value) and/or a minimum number of processing unit utilized by the terminal for the CSI reporting, which may be applied when CSI reporting for beam management and/or beam reporting use, that is, L1-RSRP report, is performed.

Hereinafter, some implementations of the present disclosure are described in detail with reference to the accompanying drawings. A detailed description to be disclosed along with the accompanying drawings is intended to describe some exemplary implementations of the present disclosure and is not intended to describe a sole implementation of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

Hereinafter, downlink (DL) means communication from a base station to a terminal, and uplink (UL) means communication from a terminal to a base station. In downlink, a transmitter may be part of a base station, and a receiver may be part of a terminal. In uplink, a transmitter may be part of a terminal, and a receiver may be part of a base station. A base station may be represented as a first communication device, and a terminal may be represented as a second communication device. A base station (BS) may be substituted with a term, such as a fixed station, an evolved-NodeB (eNB), a next generation NodeB (gNB), a base transceiver system (BTS), an access point (AP), a network (5G network), an AI system, a road side unit (RSU) or a robot. Furthermore, a terminal may be fixed or may have mobility, and may be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot or an AI module.

The following technology may be used for various radio access systems, such as CDMA, FDMA, TDMA, OFDMA, and SC-FDMA. CDMA may be implemented as a radio technology, such as universal terrestrial radio access (UTRA) or CDMA2000. TDMA may be implemented as radio technology, such as a global system for mobile communications (GSM)/general packet radio service (GPRS)/enhanced data rates for GSM evolution (EDGE). OFDMA may be implemented as a radio technology, such as IEEE 802.11 (Wi-Fi), IEEE 802.16 (WiMAX), IEEE 802-20, or evolved UTRA (E-UTRA). UTRA is part of a universal mobile telecommunications system (UMTS). 3rd generation partnership project (3GPP) long term evolution (LTE) is part of an evolved UMTS (E-UMTS) using E-UTRA, and LTE-Advanced (A)/LTE-A pro is an evolved version of 3GPP LTE. A 3GPP new radio or new radio access technology (NR) is an evolved version of 3GPP LTE/LTE-A/LTE-A pro.

In order to clarify the description, a 3GPP communication system (e.g., LTE-A, NR) is basically described, but the technical spirit of the present disclosure is not limited thereto. LTE means a technology after a 3GPP TS 36.xxx Release 8. Specifically, an LTE technology after 3GPP TS 36.xxx Release 10 is denoted as LTE-A, and an LTE technology after 3GPP TS 36.xxx Release 13 is denoted as LTE-A pro. 3GPP NR means a technology after TS 38.xxx Release 15. LTE/NR may be denoted as a 3GPP system. "xxx" means a detailed number of the standard document. LTE/NR may be commonly called a 3GPP system. For the background technology, terms, and abbreviations used in the description of the present disclosure, reference may be made to contents described in the standard document disclosed prior to the present disclosure. For example, reference may be made to the following documents.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more communication devices require a higher communication capacity, there emerges a need for enhanced mobile broadband communication compared to the existing radio access technology. Furthermore, massive machine type communications (MTC) that provides various services anywhere and at anytime by connecting multiple devices and things is also one of major issues that will be taken into consideration in next-generation communication. Furthermore, a communication system design in which service/terminal sensitive to reliability and latency is taken into consideration is discussed. As described above, the introduction of a next-generation radio access technology in which enhanced mobile broadband communication (eMBB), massive MTC (Mmtc), ultra-reliable and low latency communication (URLLC), etc. are taken into consideration is discussed. In this disclosure, the corresponding technology is called NR, for convenience sake. NR is an expression showing an example of a 5G radio access technology (RAT)).

A new RAT system including NR uses an OFDM transmission technique or a transmission technique similar to OFDM transmission. The new RAT system may comply with OFDM parameters different from OFDM parameters of LTE. Alternatively, the new RAT system may comply with the numerology of the existing LTE/LTE-A or may have a greater system bandwidth (e.g., 100 MHz). Alternatively, one cell may support a plurality of numerologies. That is, terminals operating in different numerologies may coexist within one cell.

Numerology corresponds to one subcarrier spacing in a frequency domain. A different numerology may be defined by scaling reference subcarrier spacing using an integer N.

Three major requirement areas of 5G includes (1) an enhanced mobile broadband (eMBB) area, (2) a massive machine type communication (mMTC) area and (3) an ultra-reliable and low latency communications (URLLC) area.

Some use cases may require multiple areas for optimization, and other use cases may be focused on only one key performance indicator (KPI). 5G supports such various use cases in a flexible and reliable manner.

eMBB enables basic mobile Internet access to be greatly surpassed, and covers abundant directional tasks and media and entertainment applications in cloud or augmented reality. Data is one of core power of 5G. Dedicated voice service may not be first seen in the 5G era. In 5G, it is expected that voice will be processed as an application program using a data connection simply provided by a communication system. Major causes of an increased traffic volume include an increase of a content size and an increase in the number of applications that require a high data transfer rate. Streaming service (audio and video), dialogue video, and a mobile Internet connection will be more widely used as more devices are connected to the Internet. Such many application programs require connectivity in which the programs are always turned on in order to push real-time information and notification to a user. Cloud storage and applications rapidly increase in mobile communication platforms, which may be applied to both business and entertainment. Furthermore, cloud storage is a special use case that pulls the growth of an uplink data transfer rate. 5G is also used for remote business of cloud, and requires much lower end-to-end latency in order to maintain excellent user experiences when a tactile interface is used. Entertainment, for example, cloud game and video streaming are other core elements that increase needs for a mobile wideband capability. Entertainment is essential for smartphones and tablets anywhere, including high mobility environments, such as a train, vehicle and airplane. Another use case is augmented reality and information search for entertainment. In this case, augmented reality requires very low latency and an instant data volume.

Furthermore, one of 5G use cases that is most expected is related to a function capable of smoothly connecting embedded sensors in all the fields, that is, mMTC. It is expected that potential IoT devices will reach 20.4 billions until 2020. In industry IoT, 5G is one of regions performing major roles that enable a smart city, asset tracking, a smart utility, agriculture and security infra.

URLLC includes a new service that will change the industry through a link having ultra-reliability/available low latency, such as remote control of major infra and a self-driven vehicle. A level of reliability and latency is essential for smart grid control, industry automation, robot engineering, drone control and adjustment.

Multiple Use Cases are Described More Specifically.

5G is means for providing a stream evaluated as Giga bits per second in several hundreds of mega bits per second, and may supplement for fiber-to-the-home (FTTH) and cable-based wideband (or DOCSIS). Such a fast speed is necessary to deliver TV with resolution of 4K or more (6K, 8K and more) in addition to virtual reality and augmented reality. Virtual reality (VR) and augmented reality (AR) applications include nearly immersive sports. A specific application program may require a special network configuration. For example, in the case of VR game, in order for game companies to minimize latency, a core server may need to be integrated with an edge network server of a network operator.

It is expected that an automotive will become important new power in 5G along with many use cases for mobile communication for an automotive. For example, entertainment for a passenger requires both a high capacity and a high mobility mobile wideband. The reason for this is that a future user will continue to expect a connection of high quality regardless of his or her location and speed. Another use example of the automotive field is an augmented reality dashboard. The augmented reality dashboard enables a driver to identify an object in the dark on a thing reported through the front window, and overlaps and displays information spoken to the driver with respect to the distance and movement of the object. In the future, a wireless module enables communication between vehicles, information exchange between a vehicle and a supported infrastructure, and information exchange between a vehicle and other connected devices (e.g., devices accompanied by a pedestrian). A safety system shows alternative courses of a behavior so that a driver can drive more safely, thereby being capable of reducing a danger of an accident. A next step will be a remote-controlled or self-driven vehicle. This requires very reliable and very fast communication between different self-driven vehicles and between a vehicle and infra. In the future, a self-driven vehicle may perform all driving activities, and a driver will be focused on only traffic abnormality that cannot be identified by a vehicle itself. Technical requirements of a self-driven vehicle include ultra-low latency and ultra-high speed reliability so that traffic safety is increased up to a level of the extent that that cannot be achieved by a person.

A smart city and a smart home mentioned as a smart society will be embedded as a high density wireless sensor network. A distributed network of intelligent sensors will identify a condition for the cost- and energy-efficient maintenance of a city or house. A similar configuration may be performed for each home. All of a temperature sensor, a window, a heating controller, a burglar alarm and home appliances are connected wirelessly. Many of such sensors are typically a low data transmission speed, low energy and a low cost. However, for example, real-time HD video may be necessary in a specific type of a device for surveillance.

The consumption and distribution of energy including heat or gas require automated control of a distributed sensor network because they are highly distributed. A smart grid collects information, and interconnects such sensors using digital information and communication technologies so that the sensors behavior based on the information. The information may include supplier and consumer behaviors, so the smart grid can improve the distribution of fuel, such as electricity, in manners, such as efficiency, reliability, economics, production sustainability and automation. The smart grid may be considered to be a different sensor network having low latency.

A health sector includes many application programs that may reap the benefits of mobile communication. A communication system may support remote medical treatment that provides clinical medical treatment at a remote place. This may help to reduce a barrier for the distance and to improve access to medical services that are not continuously used at a remote farming area. This is also used to save life in medical treatment and an urgent situation. A mobile communication-based wireless sensor network may provide remote monitoring and sensors for parameters, such as a heart rate and blood pressure.

Wireless and mobile communication becomes more important in the industry application field. An installation and maintenance cost for wires is high. Accordingly, the possibility that the wires are substituted with radio links capable of reconfiguring a cable is an attractive opportunity in many industry fields. However, to achieve the opportunity requires that a wireless connection operates with latency, reliability and capacity similar to those of the cable and that management thereof is simplified. A low latency and very low error probability is a new requirement that needs to be connected to 5G.

Logistics and freight tracking are an important use case for mobile communication, which enables the tracking of an inventory and package anywhere using a location-based information system. A use case of logistics and freight tracking typically requires a low data speed, but requires a wide area and reliable location information.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system according to some implementations of the present disclosure.

Referring to FIG. 1, an NG-RAN is configured with gNBs that provide an NG-RA user plane (new AS sublayer/PDCP/RLC/MAC/PHY) and a control plane (RRC) protocol for a user equipment (UE).

The gNBs are connected to each other via an Xn interface.

The gNBs are also connected to an NGC via an NG interface.

More specifically, the gNBs are connected to an access and mobility management function (AMF) via an N2 interface and a user plane function (UPF) via an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used in a very high subcarrier frequency, a numerology to be used may be selected regardless of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} \cdot N_f/100) \cdot T_s=10$ ms. The radio frame is composed of ten subframes each having a section of $T_{sf}=(\Delta f_{max} \cdot N_f/1000) \cdot T_s=1$ ms. In this case, there may be a set of UL frames and a set of DL frames.

Figure 2:
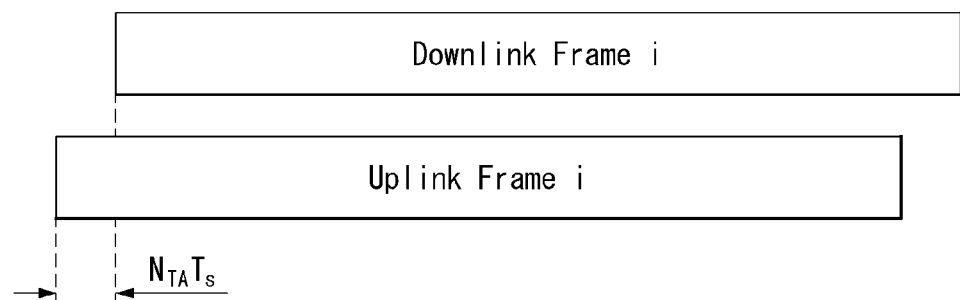
FIG. 2 illustrates an example of a relationship between an uplink (UL) frame and a downlink (DL) frame in a wireless communication system according to some implementations of the present disclosure.

FIG. 2 illustrates a relationship between a UL frame and a DL frame in a wireless communication system according to some implementations of the present disclosure.

As illustrated in FIG. 2, an UL frame number I from a user equipment (UE) needs to be transmitted $T_{TA}=N_{TA}T_s$ before the start of a corresponding DL frame in the UE.

Regarding the numerology μ, slots are numbered in ascending powers of $n_s^\mu \in \{0, \ldots, N_{subframe}^{slots,\mu}-1\}$ in a subframe, and in ascending powers of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined based on a used numerology and slot configuration. The start of slots $n_s^\mu$ in the subframe is temporally aligned with the start of OFDM symbols $n_s^\mu N_{symb}^\mu$ in the same subframe.

All the terminals cannot perform transmission and reception at the same time, which means that all the OFDM symbols of a downlink slot or uplink slot cannot be used.

Table 2 shows the number of OFDM symbols ($N_{symb}^{slot}$) for each slot, the number of slots ($N_{slot}^{frame,\mu}$) for each radio frame, and the number of slots ($N_{slot}^{subframe,\mu}$) for each subframe in a normal CP. Table 3 shows the number of OFDM symbols for each slot, the number of slots for each radio frame, and the number of slots for each subframe in an extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
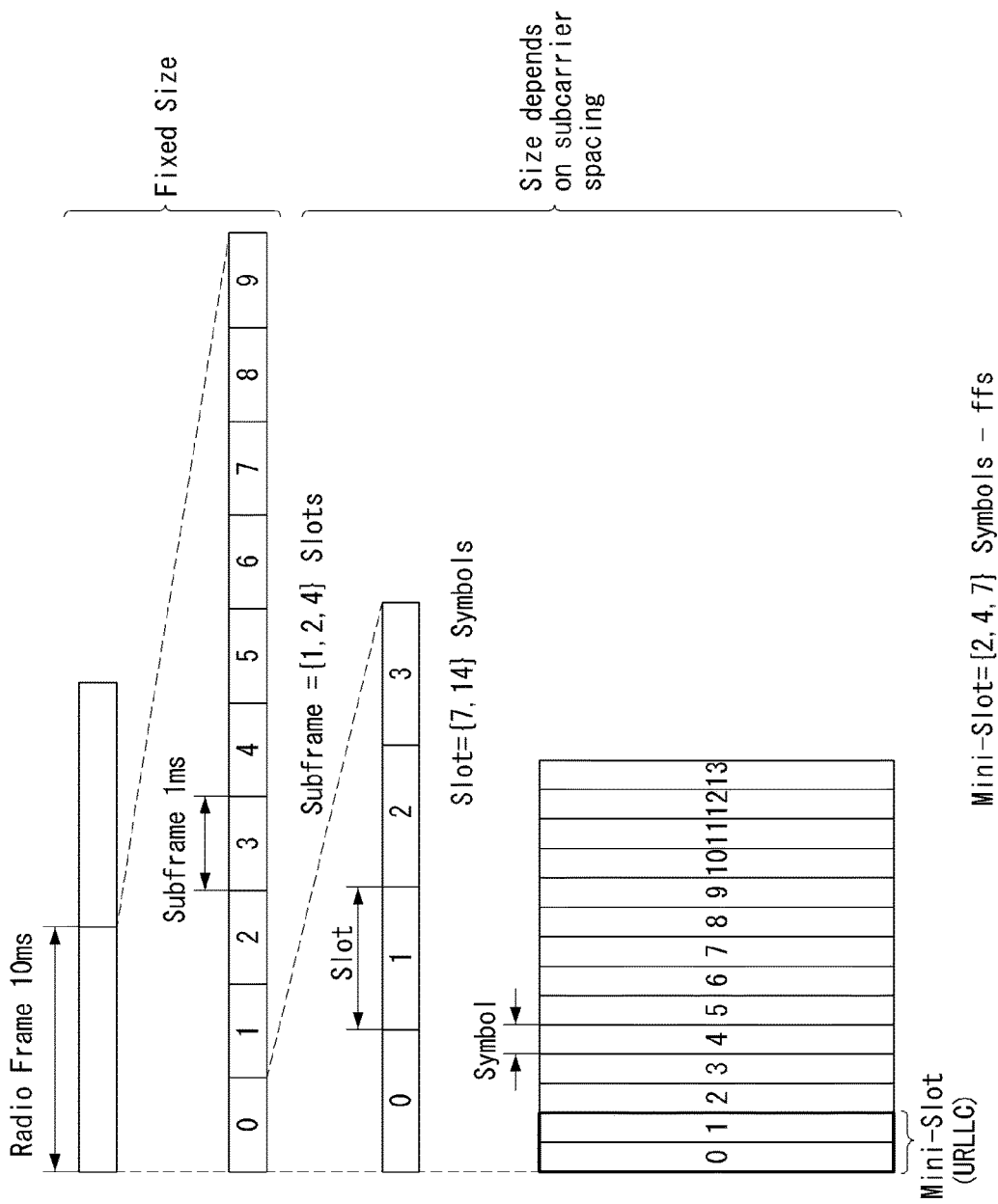
FIG. 3 shows an example of a frame structure in an NR system.

FIG. 3 shows an example of a frame structure in an NR system. FIG. 3 is merely for convenience of description and does not limit the scope of the present disclosure.

Table 3 is an example in which μ=2, that is, subcarrier spacing (SCS) is 60 kHz. Referring to Table 2, 1 subframe (or frame) may include 4 slots. A 1 subframe={1,2,4} slots shown in FIG. 3 is an example, and the number of slots that may be included in 1 subframe may be defined like Table 2.

Furthermore, a mini-slot may be configured with 2, 4 or 7 symbols and may be configured with symbols more or less symbols than the 2, 4 or 7 symbols.

In relation to a physical resource in the NR system, an antenna port, a resource grid, a resource element, a resource block, a carrier part may be taken into consideration.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a quasi co-located or quasi co-location (QC/QCL) relationship. In this case, the large-scale properties may include at least one of delay spread, Doppler spread, Doppler shift, average gain, and average delay.

Figure 4:
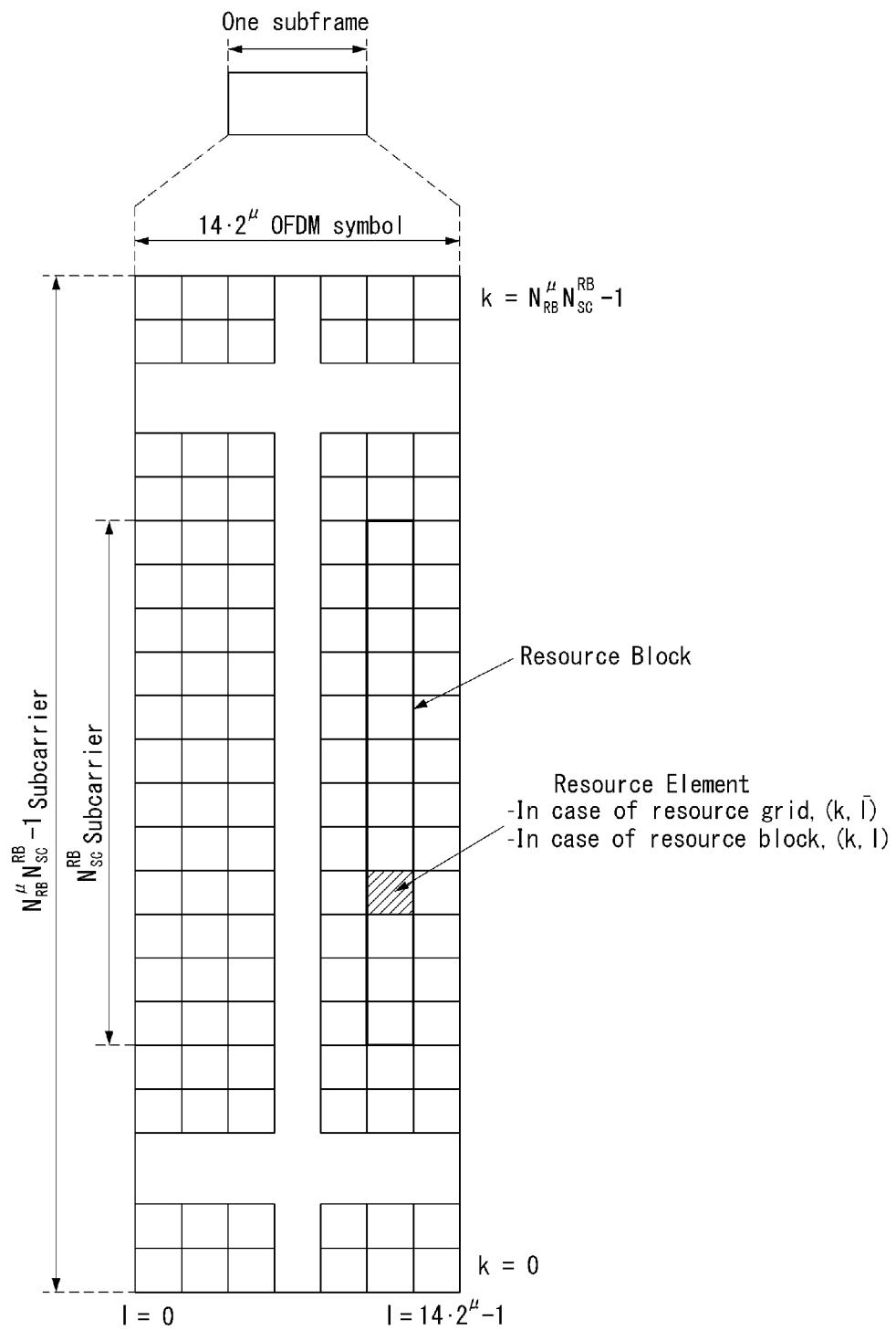
FIG. 4 shows an example of a resource grid supported in a wireless communication system according to implementations of the present disclosure.

FIG. 4 illustrates an example of a resource grid supported in a wireless communication system according to some implementations of the present disclosure.

Referring to FIG. 4, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols, wherein $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 5:
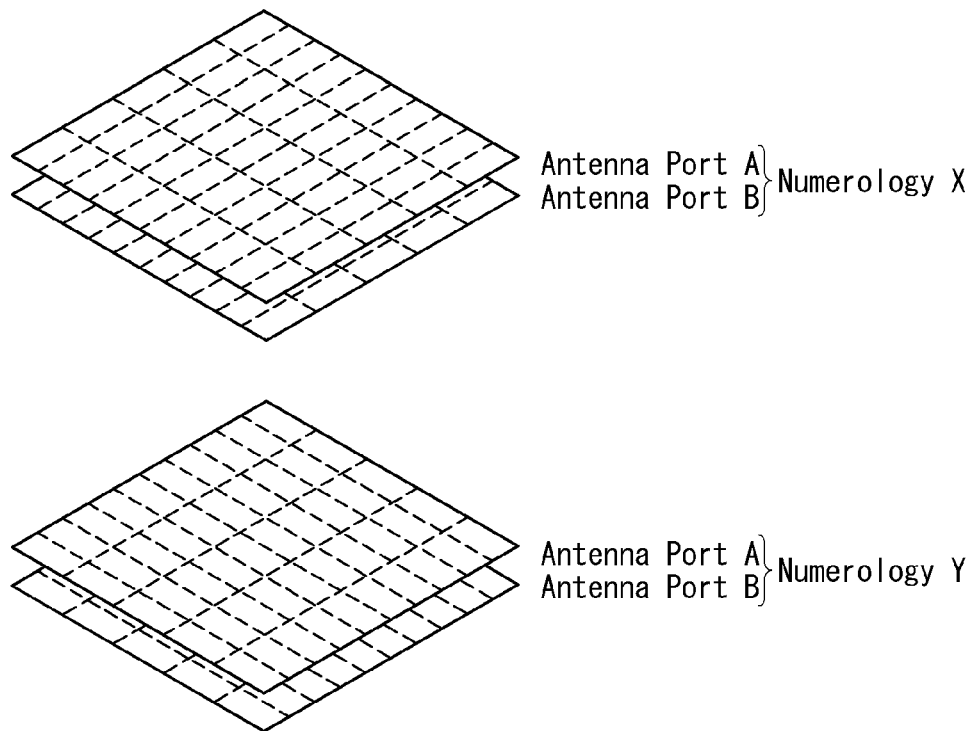
FIG. 5 shows examples of a resource grid for each antenna port and numerology according to some implementations of this disclosure.

In this case, as illustrated in FIG. 5, one resource grid may be configured for the numerology $\mu$ and an antenna port p.

FIG. 5 illustrates examples of resource grids for each antenna port and numerology according to some implementations of this disclosure.

Each element of the resource grid for the numerology $\mu$ and the antenna port p is indicated as a resource element, and may be uniquely identified by an index pair (k,l̄). In this case, k=0, ..., $N_{RB}^{\mu} N_{sc}^{RB}-1$ is an index in the frequency domain, and l̄=0, ..., $2^{\mu} N_{symb}^{(\mu)}-1$ indicates a location of a symbol in a subframe. To indicate a resource element in a slot, the index pair (k,l) is used. In this case, l=0, ..., $N_{symb}^{\mu}-1$.

A resource element (k,l̄) for a numerology $\mu$ and an antenna port p corresponds to a complex value $a_{k,\bar{l}}^{(p,\mu)}$. If there is no danger of confusion or if a specific antenna port or numerology is not specified, indices p and $\mu$ may be dropped. As a result, a complex value may be $a_{k,\bar{l}}^{(p)}$ or $a_{k,\bar{l}}$.

Furthermore, a physical resource block is defined as $N_{sc}^{RB}=12$ contiguous subcarriers on the frequency domain.

A point A plays a role as a common reference point of a resource block grid and may be obtained as follows.

offsetToPointA for PCell downlink indicates a frequency offset between the lowest subcarrier of the lowest resource block, overlapping an SS/PBCH block used for a UE for initial cell selection, and the point A, and is represented as a resource block units assuming a 15 kHz subcarrier spacing for FR1 and a 60 kHz subcarrier spacing for FR2;

absoluteFrequencyPointA indicates the frequency-location of the point A represented as in an absolute radio-frequency channel number (ARFCN).

Common resource blocks are numbered from 0 to the upper side in the frequency domain for the subcarrier spacing configuration $\mu$.

The center of the subcarrier 0 of a common resource block 0 for the subcarrier spacing configuration $\mu$ is identical with the 'point A.' A resource element (k,l) for a common resource block number $n_{CRB}^{\mu}$ and the subcarrier spacing configuration $\mu$ in the frequency domain may be given like Equation 1 below.

$$n_{CRB}^{\mu} = \left\lfloor \frac{k}{N_{sc}^{RB}} \right\rfloor \qquad \text{Equation 1}$$

In this case, k may be relatively defined at the point A so that k=0 corresponds to a subcarrier having the point A as the center. Physical resource blocks are numbered from 0 to $N_{BWP,i}^{size}-1$ within a bandwidth part (BWP). i is the number of a BWP. In the BWP i, the relation between the physical resource block $n_{PRB}$ and the common resource block $n_{CRB}$ may be given by Equation 2 below.

$$n_{CRB} = n_{PRB} + N_{BWP,i}^{start} \qquad \text{Equation 2}$$

In this case, $N_{BWP,j}^{start}$ may be a common resource block in which the BWP relatively starts in the common resource block 0.

Bandwidth Part (BWP)

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., subcarrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., subcarrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer. In this case, the activated DL/UL BWP is defined as an active DL/UL BWP. However, if a terminal is in an initial access process or in a situation before an RRC connection is set up, the terminal may not receive a configuration for a DL/UL BWP. In such a situation, a DUUL BWP assumed by the terminal is defined as an initial active DL/UL BWP.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

Figure 6:
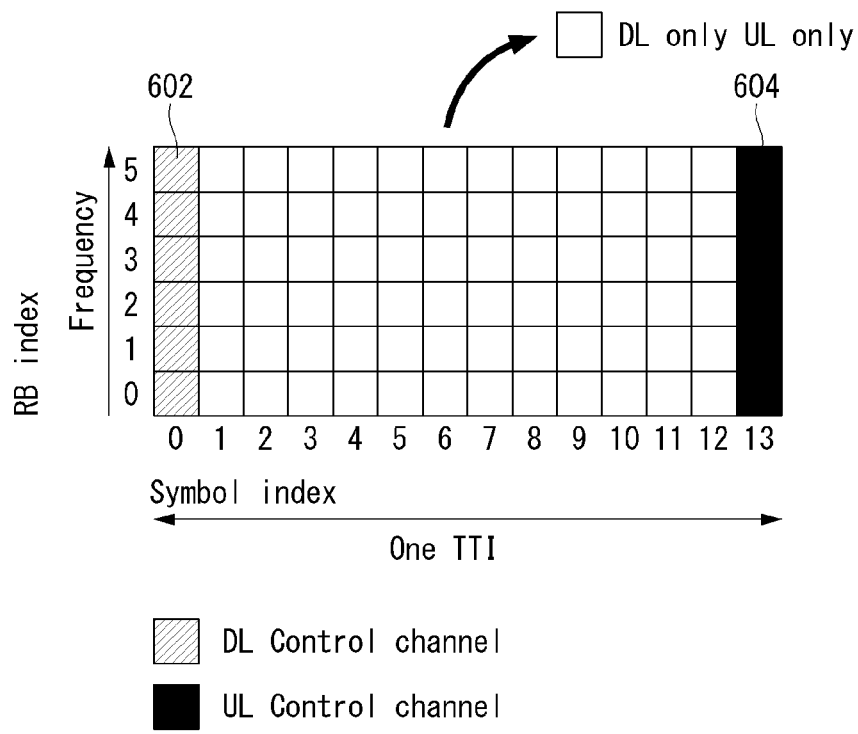
FIG. 6 shows an example of a self-contained structure according to some implementations of this disclosure.

FIG. 6 shows an example of a self-contained structure according to some implementations of this disclosure. FIG. 6 is merely for convenience of description and does not limit the scope of the present disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

The following contents are discussed in relation to CSI measurement and/or reporting.

As used herein, the parameter Z refers to a minimum required time for a terminal to perform CSI reporting, e.g., a minimum time duration (or time gap) starting from a timing at which a terminal receives DCI that schedules the CSI reporting until a timing at which the terminal performs actual CSI reporting.

Furthermore, a time offset of a CSI reference resource may be derived based on a minimum time duration starting from a timing at which a terminal receives a measurement resource (e.g., CSI-RS) related to CSI reporting until a timing at which the terminal performs actual CSI reporting (referred to herein as Z') and based on a numerology (e.g., subcarrier spacing) for CSI latency.

Specifically, in relation to the calculation (or computation) of CSI, Z and Z' values may be defined as in the examples of Table 4 to Table 7. In this case, Z is related to only aperiodic CSI reporting. For example, the Z value may be represented as the sum of a decoding time for DCI (scheduling CSI reporting) and a CSI processing time (e.g., Z' to be described later). Furthermore, in the case of a Z value of a normal terminal, a channel state information-reference signal (CSI-RS) may be assumed to be positioned after the last symbol of a PDCCH symbol (i.e., the symbol of a PDCCH in which DCI is transmitted).

Furthermore, as discussed above, the parameter Z' may refer to a minimum duration (or time gap) from a timing at which a terminal receives a measurement resource (i.e., CMR, IMR) (e.g., CSI-RS) related to CSI reporting to a timing at which the terminals performs actual CSI reporting. In general, a relation may be described between (Z, Z') and numerology and CSI latency, as shown in the example of Table 4.

TABLE 4

| CSI latency | Units | 15 kHz SCS ($\mu = 0$) | 30 kHz SCS ($\mu = 1$) | 60 kHz SCS ($\mu = 2$) | 120 kHz SCS ($\mu = 3$) |
|---|---|---|---|---|---|
| Low latency | Symbols | (Z1,1, Z'1,1) | (Z1,2, Z'1,2) | (Z1,3, Z'1,3) | (Z1,4, Z'1,4) |
| High latency | Symbols | (Z2,1, Z'2,1) | (Z2,2, Z'2,2) | (Z2,3, Z'2,3) | (Z2,4, Z'2,4) |

Furthermore, Table 5 and Table 6 show examples of CSI calculation times for a normal UE and CSI calculation times for an advanced UE, respectively. Table 5 and Table 6 are merely examples and are not limiting.

TABLE 5

| CSI latency | Units | 15 kHz SCS ($\mu = 0$) | 30 kHz SCS ($\mu = 1$) | 60 kHz SCS ($\mu = 2$) | 120 kHz SCS ($\mu = 3$) |
|---|---|---|---|---|---|
| Low latency | Symbols | (22, 15) | (25, 16) | (33, 19) | (49, 25) |
| High latency | Symbols | (29, 22) | (32, 23) | (40, 26) | (56, 32) |

TABLE 6

| CSI latency | Units | 15 kHz SCS ($\mu = 0$) | 30 kHz SCS ($\mu = 1$) | 60 kHz SCS ($\mu = 2$) | 120 kHz SCS ($\mu = 3$) |
|---|---|---|---|---|---|
| Low latency | Symbols | (12, 7) | (12, 7) | (12, 7) | (12, 7) |
| High latency | Symbols | (19, 14) | (19, 14) | (19, 14) | (19, 14) |

Furthermore, in relation to the above-described CSI latency, it may be assumed that when N CSI reportings are triggered, up to X CSI reportings will be calculated in a given time. In this case, X may be based on UE capability information. Furthermore, in relation to the above-described Z (and/or Z'), a terminal may be configured to ignore DCI scheduling CSI reporting that does not satisfy a condition related to the Z value.

Furthermore, information (i.e., information for (Z, Z')) related to CSI latency, such as that described above, may be reported (to the base station) as UE capability information by a terminal.

For example, if aperiodic CSI reporting through only a PUSCH configured as single CSI reporting is triggered, a terminal may not expect that it will receive scheduling downlink control information (DCI) having a symbol offset, such as 'M-L-N<Z.' Furthermore, if an aperiodic channel state information-reference signal (CSI-RS) is used for channel measurement and has a symbol offset, such as 'M-O-N<Z', a terminal may not expect that it will receive scheduling DCI.

In the above description, L may indicate the last symbol of a PDCCH triggering aperiodic reporting, M may indicate the starting symbol of a PUSCH, and N may indicate a timing advanced (TA) value of a symbol unit. Furthermore, O may mean the latest symbol of the last symbol of an aperiodic CSI-RS for a channel measurement resource (CMR), the last symbol (if present) of an aperiodic non zero power (MZP) CSI-RS for an interference measurement resource (IMR), and the last symbol (if present) of aperiodic channel state information-interference measurement (CSI-IM). The CMR may mean an RS and/or resource for channel measurement, and the IMR may mean an RS and/or resource for interference measurement.

In relation to the above-described CSI reporting, a case where CSI reportings collide against each other may occur. In this case, the collision of the CSI reportings may mean that the time occupancies of physical channels scheduled to transmit CSI reportings overlap in at least one symbol and are transmitted in the same carrier. For example, if 2 or more CSI reportings collide against each other, one CSI reporting may be performed according to the following rule. In this case, priority of CSI reporting may be determined using a sequential technique of first applying Rule #1 and then applying Rule #2. Rule #2, Rule #3, and Rule #4 of the following rules may be applied to only all periodic reporting and semi-persistently reporting aimed at a PUCCH.

Rule #1: in the operating viewpoint on a time domain, aperiodic (AP) CSI>PUSCH-based semi-persistent (SP) CSI>PUCCH-based semi-persistent CSI>periodic (P) CSI Rule #2: in the CSI content viewpoint, beam management (e.g., beam reporting)-related CSI>CSI acquisition-related CSI Rule #3: in the cell ID (cellID) viewpoint, a primary cell (PCell)>a primary secondary cell (PSCell)>different IDs (in increasing order)

Rule #4: in the CSI reporting-related ID (e.g., csiReportID) viewpoint, in order that the indices of IDs increase Furthermore, in relation to the above-described CSI reporting, a processing unit (e.g., CPU) may be defined. For example, a terminal supporting X CSI calculations (e.g., based on UE capability information 2-35) may mean that the terminal utilizes X processing units to report CSI. In this case, the number of CSI processing units may be represented as K_s.

For example, in the case of aperiodic CSI reporting using an aperiodic CSI-RS (configured with a single CSI-RS resource in a resource set for channel measurement), a CSI processing unit may be maintained in the state in which symbols from the first OFDM symbol to the last symbol of a PUSCH carrying CSI reporting after PDCCH triggering have been occupied.

For another example, if N CSI reportings (each one being configured with a single CSI-RS resource in a resource set for channel measurement) are triggered in a slot, but a terminal has only M un-occupied CSI processing units, the corresponding terminal may be configured to update (i.e., report) only M of the N CSI reportings.

Furthermore, in relation to the above-described X CSI calculations, the UE capability may be configured to support any one of a Type CSI processing capability or a Type B CSI processing capability.

For example, it is assumed that an aperiodic CSI trigger state (A-CSI trigger state triggers N CSI reportings (in this case, each CSI reporting is associated with ($Z\_n$, $Z'\_n$)) and has un-occupied CSI processing units.

In the case of the Type CSI processing capability, if a time gap between the first symbol of a PUSCH and the last symbol related to aperiodic CSI-RS/aperiodic CSI-IM does not have a sufficient CSI calculation time according to $Z'_{TOT}=\Sigma_{n=1}^{M}Z'_n$, a terminal may not expect that any one of triggered CSI reportings will be updated. Furthermore, the terminal may ignore DCI scheduling a PUSCH having a scheduling offset smaller than $Z'_{TOT}=\Sigma_{n=1}^{M}Z'_n$.

In the case of the Type B CSI processing capability, if a PUSCH scheduling offset does not have a sufficient a CSI calculation time according to a corresponding Z' value in corresponding reporting, a terminal may not expect that CSI reporting will be updated. Furthermore, the terminal may ignore DCI scheduling a PUSCH having a scheduling offset smaller than any one of Z values for other reportings.

For another example, CSI reporting based on a periodic and/or semi-persistent CSI-RS may be assigned to a CSI processing unit depending on a Type A method or a Type B method. The Type A method may assume a serial CSI processing implementation, and the Type B method may assume a parallel CSI processing implementation.

In the Type A method, in the case of periodic and/or semi-persistent CSI reporting, a CSI processing unit may occupy symbols from the first symbol of a CSI reference resource of periodic and/or semi-persistent CSI reporting to the first symbol of a physical channel carrying corresponding CSI reporting. In the case of aperiodic CSI reporting, a CSI processing unit may occupy symbols from the first symbol after a PDCCH triggering corresponding CSI reporting to the first symbol of a physical channel carrying corresponding CSI reporting.

In the Type B method, periodic or aperiodic CSI reporting setting based on a periodic and/or semi-persistent CSI-RS may be allocated to one or K_s CSI processing units, and may always occupy one or K_s CSI processing units. Furthermore, activated semi-persistent CSI reporting setting may be allocated to one or K_s CSI processing units, and may occupy one or K_s CSI processing units until it is deactivated. When semi-persistent CSI reporting is activated, a CSI processing unit may be used for other CSI reporting.

Furthermore, in the case of the above-described Type CSI processing capability, when the number of CSI processing units occupied by periodic and/or semi-persistent CSI reporting exceeds the number of simultaneous CSI calculations (X) according to UE capability, a terminal may not expect that the periodic and/or semi-persistent CSI reporting will be updated.

First Implementation

In the present implementation, examples of configuring the assignment, allocation and/or occupancy of a CSI processing unit for one or more CSI reportings are described.

In relation to the above-described processing unit (e.g., CPU), a rule for determining which CSI will use a CSI processing unit, that is, which CSI will be allocated to a CSI processing unit, needs to be taken into consideration. In this disclosure, in relation to a CSI processing unit, CSI will mean or denote CSI reporting.

For convenience of description, in the present implementation, a case where a terminal has X CSI processing units, X-M CSI processing units of the X CSI processing units are occupied (i.e., used) for CSI calculation, and M CSI processing units are not occupied is assumed. That is, M may mean the number of CSI processing units not occupied by CSI reporting.

In this case, at specific timing (e.g., a specific OFDM symbol), N CSI reportings greater than M may start the occupancy of a CSI processing unit.

For example, when the occupancy (i.e., use) of a CSI processing unit starts with respect to 3 CSI reportings in the state in which M is 2 in an n-th OFDM symbol, only two of 3 CSI reportings occupy the CSI processing unit. In this case, a CSI processing unit is not allocated (or assigned) to the remaining one CSI reporting, and CSI for the corresponding CSI reporting cannot be calculated. With respect to the not-calculated CSI, a technique of defining (or agreeing) that the most recently calculated and/or reported CSI is reported again or defining (or agreeing) that a preset specific CSI value is reported or defining (or agreeing that reporting is not performed regarding the corresponding CSI reporting may be taken into consideration.

Hereinafter, the present implementation utilizes the following example techniques for priority regarding which CSI reporting will be first assigned to a CSI processing unit (hereinafter priority for CSI processing unit occupancy) when contention for the occupancy of the CSI processing unit occurs. Furthermore, the priority for the occupancy of a CSI processing unit may be configured identically or similarly in the above-described CSI collision in addition to the examples to be described hereinafter.

Example 1

Priority for the occupancy of a CSI processing unit may be determined based on a latency requirement.

In an NR system, all types of CSI may be determined as any one of low latency CSI or high latency CSI. In this case, the low latency CSI may mean CSI in which the complexity of a terminal is low in CSI calculation, and the high latency CSI may mean CSI in which the complexity of a terminal is high in CSI calculation. For example, when CSI is low latency CSI, the corresponding CSI occupies a CSI processing unit for a time shorter than that of high latency CSI because the amount of CSI calculation is small.

Low latency CSI may be configured to preferentially occupy a CSI processing unit over high latency CSI. In this case, there are advantages in that when low latency CSI and high latency CSI collide against each other, the occupancy time of a CSI processing unit can be minimized by giving priority to the low latency CSI and a corresponding CSI processing unit can be rapidly used for other CSI calculation.

Alternatively, high latency CSI may be configured to preferentially occupy a CSI processing unit over low latency CSI. The reason for this is that high latency CSI has greater calculation complexity than low latency CSI and can provide more and/or accurate channel information.

Example 2

Priority for the occupancy of a CSI processing unit may be determined based on the occupancy end time of a CSI processing unit.

CSI having a short occupancy end time of a CSI processing unit may be configured to preferentially occupy a CSI processing unit.

Although occupancy starting times for a CSI processing unit are the same for multiple pieces of CSI (reporting), occupancy end times may be different. For example, although low latency CSI or high latency CSI are the same, an occupancy end time for each CSI reporting may be different depending on a channel for CSI calculation and/or a CSI-RS whose interference is measured and/or a time domain behavior (e.g., periodic, semi-persistently, aperiodic) on a CSI-Imdml time domain. There are advantages in that the occupancy time of a CSI processing unit can be minimized and a corresponding CSI processing unit can be rapidly used for CSI calculation because CSI having a short occupancy end time is given priority.

Alternatively, CSI having a long (i.e., late) occupancy end time of a CSI processing unit may be configured to preferentially occupy a CSI processing unit. The reason for this is that CSI having a long occupancy end time requires a long calculation time and can provide more and/or accurate channel information.

Example 3

Priority for the occupancy of a CSI processing unit may be determined based on a time domain behavior fora reference signal (e.g., CSI-RS) used for channel measurement and/or a reference signal (e.g., CSI-IM) used for interference measurement.

For convenience of description, in this example, in relation to CSI reporting, a case where a reference signal used for channel measurement is a CSI-RS and a reference signal used for interference measurement is CSI-IM is assumed.

The CSI-RS and/or the CSI-IM may be transmitted and received in three types, such as periodic, semi-persistent, or aperiodic. CSI calculated based on a periodic CSI-RS and/or CSI-IM has many opportunities to measure a channel and/or interference. Accordingly, CSI calculated based on an aperiodic CSI-RS and/or CSI-IM rather than CSI based on a periodic CSI-RS and/or CSI-IM may be preferred to preferentially occupy a CSI processing unit.

Accordingly, priority may be determined in order of CSI based on aperiodic CSI-RS and/or CSI-IM, CSI based on a semi-persistent CSI-RS and/or CSI-IM, and CSI based on a periodic CSI-RS and/or CSI-IM. That is, priority for the occupancy of a CSI processing unit may be determined in order of 'CSI based on aperiodic CSI-RS and/or CSI-IM>CSI based on a semi-persistent CSI-RS and/or CSI-IM>CSI based on a periodic CSI-RS and/or CSI-IM.' Such priority may be extended and applied to the above-described CSI collision rule in addition to priority for the occupancy of a CSI processing unit.

Alternatively, priority may be determined in order of CSI based on a periodic CSI-RS and/or CSI-IM, CSI based on a semi-persistent CSI-RS and/or CSI-IM, and CSI based on aperiodic CSI-RS and/or CSI-IM.

Example 4

Priority for the occupancy of a CSI processing unit may be determined based on a time domain measurement behavior.

For example, priority for the occupancy of a CSI processing unit may be determined based on whether restriction related to CSI measurement, that is, measurement restriction, has been configured.

When a terminal receives a CSI-RS and/or CSI-IM in a specific time when the measurement restriction becomes ON and generates CSI by measuring the CSI-RS and/or CSI-IM, the corresponding CSI may be configured to preferentially occupy a CSI processing unit over CSI measured when the measurement restriction becomes OFF. Such priority may be extended and applied to the above-described CSI collision rule in addition to priority for the occupancy of a CSI processing unit.

Alternatively, when a terminal generates CSI in the state in which the measurement restriction has been OFF, the corresponding CSI may be configured to preferentially occupy a CSI processing unit over CSI measured when the measurement restriction becomes ON.

Example 5

Priority for the occupancy of a CSI processing unit may be determined based on the above-described Z value and/or Z' value. In this case, Z is related to only aperiodic CSI reporting, and may mean a minimum time (or time gap) from timing at which a terminal receives DCI scheduling CSI reporting to timing at which the terminal performs actual CSI reporting. Furthermore, Z' may mean a minimum time (or time gap) from timing at which a terminal receives a measurement resource (i.e., CMR, IMR) (e.g., CSI-RS) related to CSI reporting to timing at which the terminal performs actual CSI reporting.

A subcarrier spacing (SCS) and latency-related configuration may be different for each CSI. Accordingly, a Z value and/or a Z' value may be differently set for each CSI.

For example, when M (i.e., M CSI reportings to be assigned to a CSI processing unit) of N CSI reportings scheduled in a terminal are selected, CSI having a small Z value and/or Z' value may be configured to preferentially occupy a CSI processing unit (hereinafter example 5-1). CSI reporting having a small Z value and/or Z' value occupies a CSI processing unit for a short time, and may be efficient because a corresponding CSI processing unit may be used to calculate new CSI.

In general, CSI having a small subcarrier spacing may have higher priority in terms of CSI processing unit occupancy because a Z value and/or Z' value is smaller as the subcarrier spacing is smaller. Furthermore, low CSI may have higher priority in terms of CSI processing unit occupancy because a Z value and/or Z' value is smaller as latency is small. Furthermore, a configuration may be performed so that the occupancy sequence of CSI processing units is determined through a comparison between pieces of latency and a CSI processing unit is occupied in order of smaller subcarrier spacing when latency is the same. In contrast, a configuration may be performed so that the occupancy sequence of CSI processing units is determined through a comparison between subcarrier spacings and a CSI processing unit is occupied in order of lower latency when the subcarrier spacing is the same.

For another example, when M (i.e., M CSI reportings to be assigned to a CSI processing unit) of N CSI reportings scheduled in a terminal are selected, CSI having a great Z value and/or Z' value may be configured to preferentially occupy a CSI processing unit (hereinafter example 5-2). CSI reporting having a great Z value and/or Z' value occupies a CSI processing unit for a long time, but may be assumed to be more important CSI although it has a long calculation time in that the corresponding CSI has a more accurate and more channel information.

In relation to the example 5, a technique of selectively applying example 5-1) and example 5-2 based on a given condition may be taken into consideration.

First, a terminal selects pieces of M CSI by giving priority to CSI having a great Z value. If CSI calculation is not performed because a Z value is greater than a processing time given by a scheduler, the terminal may select pieces of M CSI, assuming that CSI having a small Z value preferentially occupies a CSI processing unit. Otherwise, the terminal may select pieces of M CSI, assuming that CSI having a great Z value preferentially occupies a CSI processing unit. In this case, the processing time may mean the time when actual CSI reporting is performed from the triggering timing of CSI reporting, the time until actual CSI reporting is performed from a CSI reference resource, or the time until actual CSI reporting is performed from the last symbol of a CSI-RS and/or CSI-IM.

Alternatively, after a terminal determines CSI satisfying a given processing time among N pieces of CSI, it may configure the determined CSI as a valid CSI set, and may first select pieces of M CSI having a great Z value within the configured valid CSI set. Alternatively, the terminal may first select pieces of M CSI having a small Z value within the configured valid CSI set. Since CSI not included in the valid CSI set is not-calculated or -reported CSI, it may be effective that the terminal excludes not-calculated or -reported CSI of the pieces of N CSI from a contention target.

Example 6

Priority for the occupancy of a CSI processing unit may be determined based on whether a CSI-RS resource indicator (CRI) is reported.

In the case of CSI reported together with a CRI (i.e., if a CRI is included as a CSI reporting quantity), although the corresponding CSI is one piece of CSI, a CSI processing unit corresponding to the number of CSI-RSs used for measurement may be occupied. For example, when a terminal reports a CRI to select one of 8 CSI-RSs by performing channel measurement using the 8 CSI-RSs, 8 CSI processing units are occupied. In this case, a problem in that a single piece of CSI occupies many CSI processing units may occur. In order to solve this problem, in the state in which contention for the occupancy of a CSI processing unit has occurred, priority of CSI reported together with a CRI may be configured to be lower than that of CSI not reported together with a CRI.

Alternatively, priority of CSI reported together with a CRI may be configured to be higher than that of CSI not reported together with a CRI. This may be more important because CSI reported together with a CRI has a larger amount of channel information than CSI not reported together with a CRI.

Furthermore, the examples 1) to 6) may be combined with the above-described priority rules related to CSI collision and may be used to determine priority for the occupancy of a CSI processing unit.

For example, in relation to the occupancy of a CSI processing unit, the example 1) may be preferentially applied over Rules #1 to #4. This may mean that the occupancy rule of a CSI processing unit is applied by giving priority to CSI (reporting) having low latency and priority for the occupancy of a CSI processing unit is determined based on the above-described priority rule related to CSI collision when latency is the same. Alternatively, the example 1) may be applied after Rule #1 is applied and Rules #2 to #4 may be sequentially applied. Alternatively, the example 1) may be applied after Rules #1 and #2 are applied, and Rules #3 and #4 may be sequentially applied.

In the examples 1) to 6), pieces of CSI (or CSI reportings) (hereinafter prior CSI) that have already occupied a CSI processing unit at specific timing (e.g., n-th OFDM symbol) are maintained, and contention and priority between pieces of CSI (hereinafter post CSI) trying to start the occupancy of a CSI processing unit at the specific timing have been described. If this is expanded, the examples 1) to 5) may be applied to priority and contention between pieces of CSI that have already occupied a CSI processing unit at specific timing and pieces of new CSI trying to occupy a CSI processing unit.

If an M or less number of pieces of CSI try to start the occupancy of a CSI processing unit at specific timing, all the pieces of CSI may occupy the CSI processing unit without contention. In this case, if CSI exceeding the M CSI try to start the occupancy of a CSI processing unit, pieces of X-M CSI already occupying the CSI processing unit and pieces of N CSI trying to occupy the CSI processing unit may content with each other. In this case, the contention may be performed according to any one of the following two scheme.

The first scheme is a technique in which the pieces of X-M CSI and the pieces of N CSI trying to occupy the CSI processing unit equally contend with each other again. Prior CSI is CSI that has already occupied a CSI processing unit and that has vested rights, but is configured to contend with N pieces of post CSI again without an advantage.

The second scheme is a technique in which pieces of post CSI first contend with each other and an opportunity to contend with prior CSI is given to post CSI that has lost in the contention. That is, the post CSI that has lost in the contention and the prior CSI may be configured to contend with each other according to a specific rule. As a result, if priority is given to the post CSI, a CSI processing unit occupied by the prior CSI may be used for the post CSI.

If post CSI has higher priority than prior CSI by applying a specific rule, the prior CSI gives the occupancy of a CSI processing unit to the post CSI, and the corresponding CSI processing unit is used for post CSI calculation. In this case, calculation for the prior CSI has not been completed. Accordingly, with respect to reporting for corresponding CSI, a technique of defining (or agreeing) that the recently calculated or reported CSI is reported again, defining (or agreeing) that a preset specific CSI value is reported, or defining (or agreeing) that reporting is not performed may be taken into consideration.

For example, a case where the example 2) is applied to contention between post CSI and prior CSI is assumed.

If pieces of post CSI include CSI whose occupancy is terminated earlier than that of prior CSI, the post CSI may take a CSI processing unit occupied by the prior CSI. Alternatively, if the example 1) is applied, post CSI of low latency may take a CSI processing unit occupied by prior CSI of high latency.

Furthermore, as described above, CSI calculated through channel measurement based on a periodic and/or semi-persistent CSI-RS may be configured to always occupy a CSI processing unit. A technique of permitting contention between prior CSI and post CSI and configuring a CSI processing unit so that it is redistributed based on priority by being limited to the case may be taken into consideration. Furthermore, a technique of configuring prior CSI, calculated through channel measurement based on a periodic and/or semi-persistent CSI-RS, so that the prior CSI exclusively occupies a CSI processing unit without contenting with post CSI may also be taken into consideration. In this case, contention between the remaining CSI and the post CSI may be permitted.

Furthermore, as described above, in the case of the Type CSI processing capability, if a time gap between the first symbol of a PUSCH and the last symbol related to aperiodic CSI-RS/aperiodic CSI-IM has an insufficient CSI calculation time according to $Z'_{TOT} = \Sigma_{n=1}^{M} Z'_n$, a terminal may not expect that any one of triggered CSI reportings will be updated. In this case, in relation to un-occupied M CSI processing units, a technique of selecting pieces of M CSI (reportings) to be assigned to a CSI processing unit, among pieces of N CSI (reportings) scheduled in the terminal, needs to be taken into consideration.

In relation to this, the examples 1) to 6) described in this disclosure and the priority rules related to CSI collision may be used as the technique for selecting the pieces of M CSI (reportings).

Furthermore, as the technique for selecting the pieces of M CSI (reporting), M CSI that most minimizes Z_TOT and/or Z'_TOT among the pieces of N CSI may be configured to be selected. In this case, Z_TOT and/or Z'_TOT may mean an added value of Z values for CSI reportings to be reported (or updated) by a terminal and/or an added value of Z' values. If pieces of M CSI (set) that most minimize Z'_TOT and pieces of M CSI (set) that most minimize Z_TOT are different, one of the two may be finally selected. Alternatively, M CSI that most increase Z_TOT and/or Z'_TOT among the pieces of N CSI may be configured to be selected.

Furthermore, as the technique for selecting the pieces of M CSI (reportings), M CSI that makes the last symbol of an aperiodic CSI-RS and/or aperiodic CSI-IM associated with CSI reporting, among the pieces of N CSI, received at the earliest timing may be configured to be selected. Alternatively, M CSI that makes the last symbol of an aperiodic CSI-RS and/or aperiodic CSI-IM associated with CSI reporting, among the pieces of N CSI, received at the latest timing may be configured to be selected.

For example, a case where N is 3, the last symbol of an aperiodic CSI-RS and/or aperiodic CSI-IM for CSI 1 is positioned in the fifth symbol of a k-th slot, the last symbol of an aperiodic CSI-RS and/or aperiodic CSI-IM for CSI 2 is positioned in the fifth symbol of a (k−1)-th slot, and the last symbol of an aperiodic CSI-RS and/or aperiodic CSI-IM for CSI 3 is positioned in the sixth symbol of the k-th slot is assumed. In this case, if M is set as 2, the CSI 1 and the CSI 2 may be selected so that they will occupy a CSI processing unit. The reason for this is that at the moment when the CSI 3 is selected, timing at which a corresponding CSI-RS and/or CSI-IM is received is late because the last symbol of the aperiodic CSI-RS and/or aperiodic CSI-IM is positioned in the sixth symbol of the k-th slot.

CSI reporting configured and/or indicated in a terminal by a base station based on the above-described examples may be assigned and/or occupied to and/or by a CSI processing unit supported by the corresponding terminal.

Figure 7:
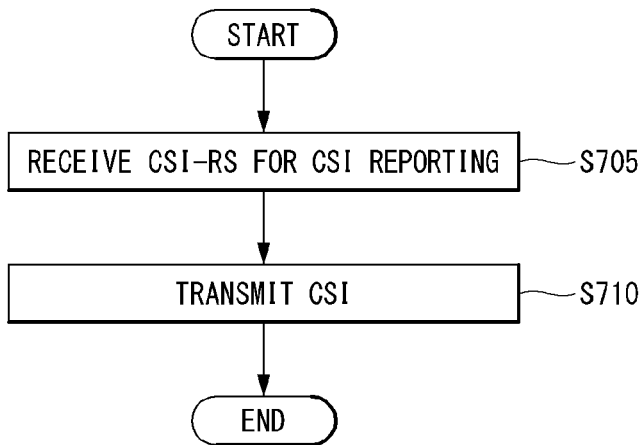
FIG. 7 shows an example of an operating flowchart of a terminal performing channel state information reporting according to some implementations of this disclosure.

FIG. 7 shows an example of an operating flowchart of a terminal performing channel state information reporting according to some implementations of this disclosure. FIG. 7 is merely for convenience of description and does not limit the scope of the present disclosure.

Referring to FIG. 7, a case where the terminal supports one or more CSI processing units for CSI reporting execution and/or CSI calculation is assumed.

The terminal may receive a channel state information-reference signal (CSI-RS) for (one or more) CSI reportings from a base station (S705). For example, the CSI-RS may be a non-zero-power (NZP) CSI-RS and/or a zero-power (ZP) CSI-RS. Furthermore, in the case of interference measurement, the CSI-RS may be substituted with CSI-IM.

The terminal may transmit, to the base station, CSI calculated based on the CSI-RS (S710).

In this case, when the number of CSI reportings configured in the terminal is greater than the number of CSI processing units not occupied by the terminal, the calculation of the CSI may be performed based on predetermined priority. In this case, the predetermined priority may be configured and/or defined as in the examples 1) to 6) described in this disclosure.

For example, the pre-configured priority may be configured based on a processing time for the CSI. The processing time may be i) a first processing time, that is, the time from the triggering timing of the CSI reporting to the execution timing of the CSI reporting (e.g., the above-described Z), or ii) a second processing time, that is, the time from the reception timing of the CSI-RS to the execution timing of the CSI reporting (e.g., the above-described Z').

Furthermore, when the number of CSI processing units not occupied by the terminal is M, M CSI reportings that minimize the sum of the first processing times or the sum of the second processing times, among one or more CSI reportings configured in the terminal, may be allocated to an M CSI processing units.

Furthermore, a CSI processing unit not occupied by the terminal may be allocated with respect to CSI that satisfies the first processing time or the second processing time, among one or more CSI reportings configured in the terminal.

For another example, the pre-configured priority may be configured based on a latency requirement for the CSI.

For yet another example, the pre-configured priority is configured based on a time domain behavior of the CSI-RS, and the time domain behavior may be one of periodic, semi-persistent, or aperiodic.

For yet another example, the pre-configured priority may be configured based on whether measurement restriction to the calculation of the CSI has been configured (e.g., ON or OFF).

For yet another example, if the CSI-RS is an aperiodic CSI-RS, the pre-configured priority may be configured based on the timing of the last symbol of the CSI-RS.

In relation to this, in an implementation aspect, the operation of the above-described terminal may be specifically implemented by the terminal device (e.g. 100 and/or 200) shown in FIGS. 15 to 18 of this disclosure. For example, the operation of the above-described terminal may be performed by the processor (e.g. 102 and/or 202) and/or the radio frequency (RF) unit (or module) (e.g. 106 and/or 206).

In a wireless communication system, a terminal that receives a data channel (e.g., PDSCH) may include a transmitter for transmitting radio signals, a receiver for receiving radio signals, and a processor functionally connected to the transmitter and the receiver. In this case, the transmitter and the receiver (or transceiver) may be denoted as an RF unit (or module) for transmitting and receiving radio signals.

For example, the processor may control the RF unit to receive a channel state information-reference signal (CSI-RS) for (one or more) CSI reportings from a base station. Furthermore, the processor may control the RF unit to transmit CSI, calculated based on the CSI-RS, to the base station.

Figure 8:
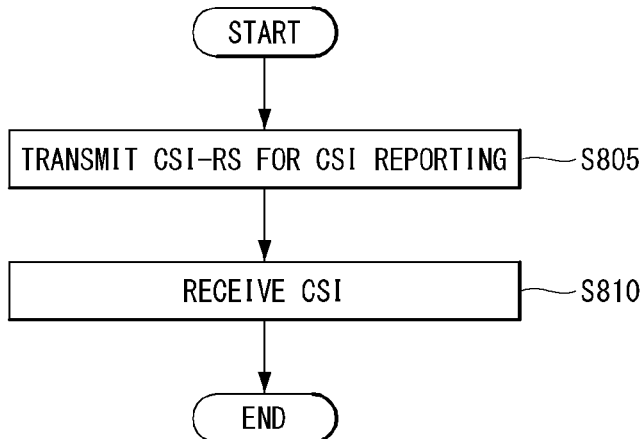
FIG. 8 shows an example of an operating flowchart of a base station receiving channel state information reporting according to some implementations of this disclosure.

FIG. 8 shows an example of an operating flowchart of a base station receiving channel state information reporting according to some implementations of this disclosure. FIG. 8 is merely for convenience of description and does not limit the scope of the present disclosure.

Referring to FIG. 8, a case where a terminal supports one or more CSI processing units for CSI reporting execution and/or CSI calculation is assumed.

The base station may transmit, to the terminal, a channel state information-reference signal (CSI-RS) for (one or more) CSI reportings (S805). For example, the CSI-RS may be a non-zero-power (NZP) CSI-RS and/or a zero-power (ZP) CSI-RS. Furthermore, in the case of interference measurement, the CSI-RS may be substituted with CSI-IM.

The base station may receive, from the terminal, CSI calculated based on the CSI-RS (S810).

In this case, when the number of CSI reportings configured in the terminal is greater than the number of CSI processing units not occupied by the terminal, the calculation of the CSI may be performed based on predetermined priority. In this case, the predetermined priority may be configured and/or defined as in the examples 1) to 6) described in this disclosure.

For example, the pre-configured priority may be configured based on a processing time for the CSI. The processing time may be i) a first processing time, that is, the time from the triggering timing of the CSI reporting to the execution timing of the CSI reporting (e.g., the above-described Z), or ii) a second processing time, that is, the time from the reception timing of the CSI-RS to the execution timing of the CSI reporting (e.g., the above-described Z').

Furthermore, when the number of CSI processing units not occupied by the terminal is M, M CSI reportings that minimize the sum of the first processing times or the sum of the second processing times, among one or more CSI reportings configured in the terminal, may be allocated to an M CSI processing units.

Furthermore, a CSI processing unit not occupied by the terminal may be allocated with respect to CSI that satisfies the first processing time or the second processing time, among one or more CSI reportings configured in the terminal.

For another example, the pre-configured priority may be configured based on a latency requirement for the CSI.

For yet another example, the pre-configured priority is configured based on a time domain behavior of the CSI-RS, and the time domain behavior may be one of periodic, semi-persistent, or aperiodic.

For yet another example, the pre-configured priority may be configured based on whether measurement restriction to the calculation of the CSI has been configured (e.g., ON or OFF).

For yet another example, if the CSI-RS is an aperiodic CSI-RS, the pre-configured priority may be configured based on the timing of the last symbol of the CSI-RS.

In relation to this, in an implementation aspect, the operation of the above-described base station may be specifically implemented by the base station device (e.g. 100 and/or 200) shown in FIGS. 15 to 18 of this disclosure. For example, the operation of the above-described base station may be performed by the processor (e.g. 102 and/or 202) and/or the radio frequency (RF) unit (or module) (e.g. 106 and/or 206).

In a wireless communication system, the base station that transmits a data channel (e.g., PDSCH) may include a transmitter for transmitting radio signals, a receiver for receiving radio signals, and a processor functionally connected to the transmitter and the receiver. In this case, the transmitter and the receiver (or transceiver) may be denoted as an RF unit (or module) for transmitting and receiving radio signals.

For example, the processor may control the RF unit to transmit a channel state information-reference signal (CSI-RS) for (one or more) CSI reportings to a terminal. Furthermore, the processor may control the RF unit to receive CSI, calculated based on the CSI-RS, from the terminal.

Second Implementation

In the present implementation, examples of setting and/or determining the above-described Z value in relation to CSI reporting (e.g., Layer1-reference signal received power reporting (L1-RSRP report)) related to beam management and/or beam reporting in addition to the above-described CSI reporting is described. In this case, the Z value is related to aperiodic CSI reporting as described above, and may mean a minimum time (or time gap) from timing at which a terminal receives DCI scheduling CSI reporting to timing at which the terminal performs actual CSI reporting.

In the present implementation, the case of L1-RSRP report is basically described, but this is only for convenience of description and the examples described in the present implementation may be applied to CSI reporting (i.e., CSI reporting configured for beam management and/or beam reporting use) related to beam management and/or beam reporting. Furthermore, in the CSI reporting related to beam management and/or beam reporting, reporting information (e.g., report(ing) quantity, report(ing) contents) may mean CSI reporting configured as at least one of i) a CSI-RS resource indicator (CRI) and reference signal received power (RSRP), ii) a synchronization signal block (SSB) and RSRP, or iii) no report (e.g., no report, none).

In addition to (normal) CSI reporting, such as that described above, in the case of L1-RSRP report, a minimum (required) time (i.e., a minimum required time related to a CSI calculation time) necessary for a terminal may be defined using the above-described Z value and/or Z' value. If a base station schedules time smaller than a corresponding time, a terminal ignores L1-RSRP triggering DCI or may not report a valid 1-RSRP value to the base station.

Hereinafter, in the present implementation, i) a case where a channel state information-reference signal (CSI-RS) and/or a synchronization signal block (SSB) used for L1-RSRP calculation is present between aperiodic L1-RSRP triggering DCI and a reporting time (i.e., L1-RSRP reporting timing) and ii) a case where a CSI-RS and/or an SSB is present prior to aperiodic triggering DCI are described, and a technique of setting a Z value in relation to L1-RSRP is described.

In this case, the aperiodic L1-RSRP triggering DCI may mean DCI for triggering aperiodic L1-RSRP report, and the CSI-RS used for L1-RSRP calculation may mean a CSI-RS used for the calculation of CSI to be used for L1-RSRP report.

Figure 9:
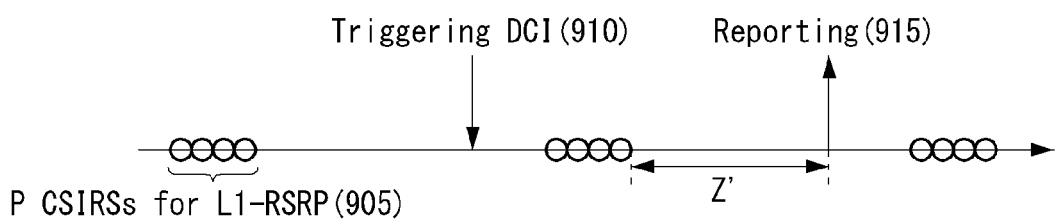
FIG. 9 shows an example of an L1-RSRP report operation in a wireless communication system.

FIG. 9 shows an example of an L1-RSRP report operation in a wireless communication system. FIG. 9 is merely for convenience of description and does not limit the scope of the present disclosure.

Referring to FIG. 9, a case where a CSI-RS and/or an SSB used for L1-RSRP calculation is present between timing at which aperiodic L1-RSRP triggering DCI is received and L1-RSRP reporting timing is assumed. FIG. 9 is described by taking the case of a periodic (P) CSI-RS as an example, but may be extended and applied to an aperiodic and/or semi-persistent CSI-RS and SSB.

In FIG. 9, 4 CSI-RSs may be transmitted in 4 OFDM symbols 905, and such 4 CSI-RSs may be periodically transmitted.

The reporting of L1-RSRP is aperiodically triggered through at least one piece of DCI. A terminal may calculate L1-RSRP using a CSI-RS(s) present in a time prior to Z' from reporting timing, and may report calculated CSI to a base station.

In the case of FIG. 9, the terminal may receive DCI triggering L1-RSRP report (905), and may calculate CSI to be used for L1-RSRP report using (one or more) CSI-RSs received prior to a Z' value (i.e., a minimum time necessary for the above-described terminal to receive a CSI-RS and to perform CSI calculation) from a reporting time 915 indicated and/or configured by the corresponding DCI.

Figure 10:
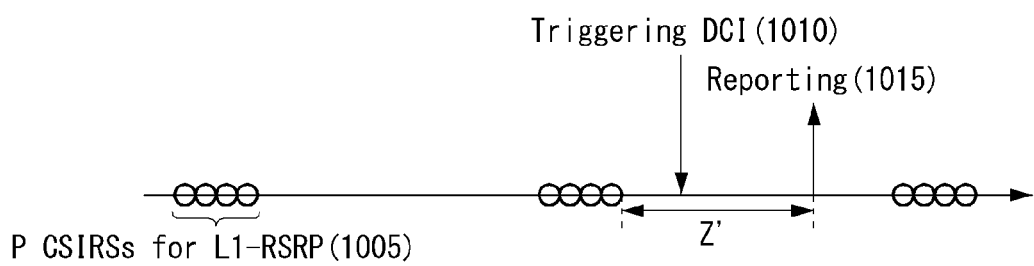
FIG. 10 shows another example of an L1-RSRP report operation in a wireless communication system.

FIG. 10 shows another example of an L1-RSRP report operation in a wireless communication system. FIG. 10 is merely for convenience of description and does not limit the scope of the present disclosure.

Referring to FIG. 10, a case where a CSI-RS and/or an SSB used for L1-RSRP calculation is not present between timing at which aperiodic L1-RSRP triggering DCI is received and L1-RSRP reporting timing and a CSI-RS and/or an SSB is present prior to aperiodic L1-RSRP triggering DCI is assumed. FIG. 10 is described by taking the case of a periodic (P) CSI-RS as an example, but may be extended and applied to an aperiodic and/or semi-persistent CSI-RS and SSB.

In FIG. 10, 4 CSI-RSs may be transmitted in 4 OFDM symbols 1005, and such 4 CSI-RSs may be periodically transmitted.

The reporting of L1-RSRP is aperiodically triggered through at least one DCI. A terminal may calculate L1-RSRP using a CSI-RS(s) present in a time prior to Z' from reporting timing, and may report calculated CSI to a base station.

In the case of FIG. 10, the terminal may need to store a measured channel and/or channel information (e.g., L1-RSRP value) based on the possibility that measurement based on a received CSI-RS will be reported because the terminal is unaware whether the received CSI-RS is reported until the terminal receives DCI triggering CSI reporting. In this case, the terminal may need to store the above-described information until timing at which the decoding of the DCI is completed, that is, the time when CSI reporting becomes clear. In this case, there may be a disadvantage in that a terminal price rises because additional memory is required.

Accordingly, a technique of restricting scheduling so that a CSI-RS and/or an SSB used for L1-RSRP calculation is present between periodic L1-RSRP triggering DCI and L1-RSRP reporting timing as in FIG. 9 may be taken into consideration. In this case, a Z value (i.e., a minimum required time for the (aperiodic) CSI reporting of a terminal) may be determined to be greater than a Z' value, and may be determined to be equal to or greater than the sum of the Z' value and the number of symbols in which the CSI-RS and/or the SSB is transmitted.

A Z value is not greatly increased because a CSI-RS is transmitted in 14 symbols or less, but a Z value may be greatly set because an SSB is transmitted in several slots (e.g., 5 ms). If the Z value increases, it may be inefficient because delay from timing at which CSI reporting is triggered to the time when actual CSI reporting is performed increases.

By taking this fact into consideration, the following examples may be taken into consideration when the Z value is determined.

Example 1

In the case of CSI reporting based on a CSI-RS, assuming that a CSI-RS and/or SSB used for L1-RSRP calculation is present between aperiodic L1-RSRP triggering DCI and reporting timing (e.g., the case of FIG. 9), a Z value may be configured to be defined as a value greater than a Z' value. Furthermore, in the case of CSI reporting based on an SSB, assuming that a CSI-RS and/or an SSB used for L1-RSRP calculation is present prior to aperiodic L1-RSRP triggering DCI (e.g., the case of FIG. 10), a Z value may be configured to be defined as a value smaller than a Z value used for the case of CSI reporting based on a CSI-RS.

Example 2

Alternatively, whether a smaller Z value will be used or a larger Z value will be used may be determined based on the time characteristic of a resource used for L1-RSRP calculation (i.e., a behavior characteristic on a time domain) (e.g., aperiodic, periodic, semi-persistently).

For example, a technique of configuring and/or defining that a CSI-RS and/or SSB having a periodic characteristic or a semi-persistently characteristic uses a smaller Z value and a CSI-RS (i.e., aperiodic CSI-RS) having an aperiodic characteristic separately uses a larger Z value may be taken into consideration.

Example 3

Consider the scenario where reporting setting related to CSI (e.g., CSI reporting setting) is configured for beam management and/or beam reporting use (i.e., if reporting information is configured as any one of i) CRI and RSRP, ii) SSB ID and RSRP, or iii) no report) and an aperiodic CSI-RS is used for the reporting setting.

In this scenario, a base station should separate and transmit a triggering DCI and an aperiodic CSI-RS for more than a minimum time based on a minimum time (e.g., m, KB) previously reported by a UE as capability. The minimum time is the time between the triggering DCI and the AP CSI-RS. In this case, the triggering DCI means DCI for triggering (or scheduling) the aperiodic CSI-RS. That is, the m value may be determined by taking a DCI decoding time into consideration. As such, the base station may need to schedule a CSI-RS by taking into consideration a DCI decoding time related to the reception of the CSI-RS that will be reported by the terminal.

Again, a certain amount of minimum time may be required by the terminal for the CSI reporting (referred to as the Z value) when aperiodic L1-RSRP is reported using the above-described CSI-RS (e.g., periodic, semi-persistent, or aperiodic CSI-RS) and/or SSB. In such scenarios, the Z value may be determined using the m value. For example, 'Z=m' may be configured so that reporting is guaranteed to be performed after decoding of the DCI is completed.

In this case, during the time duration from a timing at which the terminal receives the DCI to a timing when the terminal performs CSI reporting, an L1-RSRP encoding time and the Tx preparation time of the terminal may be additionally necessary in addition to the DCI decoding time for the terminal.

Accordingly, a Z value may need to be set greater than the m value. For example, the Z values may be simply set as m+c (e.g., where c is a constant, such as c=1).

Alternatively, a Z value may be determined to be the sum of the m value and a Z' value. For example, the Z value may be set as a value obtained by adding, to a Z' value, the time required to decode the DCI triggering an aperiodic CSI-RS. As a specific example, the Z value may be set based on a minimum required time from the last timing at which the CSI-RS of the terminal is received to CSI reporting timing and a decoding time for DCI that schedules the corresponding CSI-RS.

In relation to the examples described in the present implementation, a technique of configuring the number of processing units (e.g., CPUs) used for L-RSRP report may also be taken into consideration.

In the case of normal CSI reporting, the number of CSI processing units to be utilized or occupied may be different based on the number of CSI-RS resources (i.e., the number of CSI-RS indices) configured and/or allocated to CSI reporting. For example, as the number of CSI-RSs increases, CSI calculation complexity may increase, resulting in an increased number of processing units being utilized for the CSI reporting. In contrast, in some scenarios, the number of CSI processing units used (or configured, occupied) for L1-RSRP report may be fixed to 1. For example, L1-RSRP may be calculated by measuring each received power with respect to N CSI-RS resources or N SSBs, but L1-RSRP may be calculated as 1 CSI processing unit because a computation load is small compared to normal CSI calculation complexity.

Consequently, in normal CSI calculation, a CSI processing unit is linearly increased and used as many as the number of CSI-RS resources used for channel measurement. In the case of L1-RSRP calculation, only one CSI processing unit may be configured to be used.

Alternatively, in the case of L1-RSRP calculation, a technique of non-linearly increasing the number of CSI processing units based on the number of resources of a CSI-RS and/or SSB without fixing a used CSI processing unit may be used. For example, a technique of configuring that the number of CSI processing units is assumed to be 1 if a terminal performs L1-RSRP calculation through 16 or less CSI-RS resources and the number of CSI processing units is assumed to be 2 if a terminal performs L1-RSRP calculation on other cases may be taken into consideration.

Figure 11:
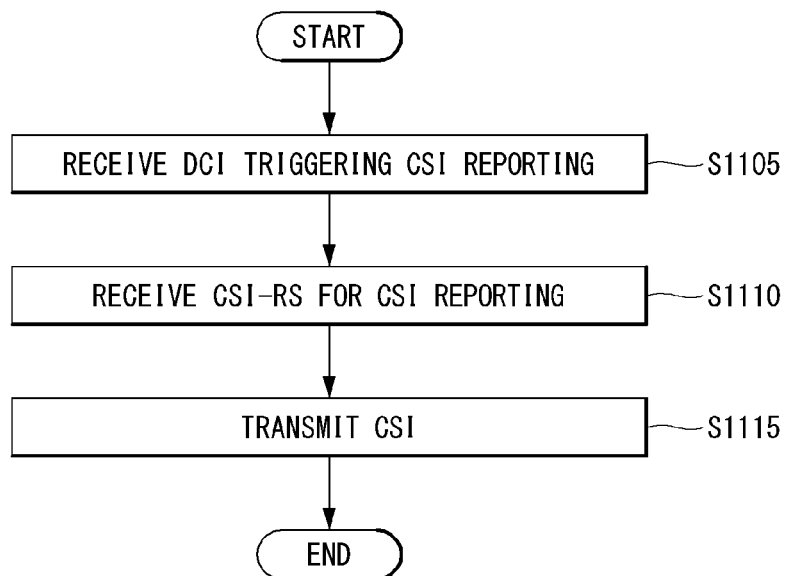
FIG. 11 shows an example of an operating flowchart of a terminal reporting channel state information according to some implementations of this disclosure.

FIG. 11 shows an example of an operating flowchart of a terminal reporting channel state information according to some implementations of this disclosure. FIG. 11 is merely for convenience of description and does not limit the scope of the present disclosure.

Referring to FIG. 11, a case where the terminal uses the examples described in the second implementation in performing L1-RSRP report is assumed. Particularly, a Z value and/or Z' value reported as UE capability information may be determined and/or configured based on the examples described in the second implementation (e.g., example 3 of the second implementation).

The terminal may receive DCI triggering CSI reporting (from a base station) (S1105). In this case, the CSI reporting may be aperiodic CSI reporting.

Furthermore, the CSI reporting may be CSI reporting for beam management and/or beam reporting use. For example, reporting information of the CSI reporting may be any one of i) a CSI-RS resource indicator (CRI) and reference signal received power (RSRP), ii) a synchronization signal block (SSB) identifier and RSRP, or iii) no report.

The terminal may receive at least one CSI-RS (i.e., configured and/or indicated for the CSI reporting) for the CSI reporting (from the base station) (S1110). For example, as shown in FIG. 9, the CSI-RS may be a CSI-RS received after DCI in step S1105 and prior to CSI reporting timing.

The terminal may transmit, to the base station, CSI calculated based on the CSI-RS (S1115). For example, the terminal may perform L1-RSRP report, measured based on the CSI-RS, on the base station.

In this case, a minimum required time for the CSI reporting (e.g., a Z value in the example 3 of the second implementation) may be configured based on i) a minimum required time (e.g., a Z' value in the example 3 of the second implementation) from the last timing of the CSI-RS to the transmission timing of the CSI and ii) a decoding time for DCI scheduling the CSI-RS (e.g., an m value in the example 3 of the second implementation). For example, the minimum required time for the CSI reporting may be configured as the sum of i) a minimum required time from the last timing of the CSI-RS to the transmission timing of the CSI and ii) a minimum required time between a DCI triggering the CSI-RS and a reception (or transmission) of the CSI-RS (i.e. a decoding time for DCI scheduling the CSI-RS) (e.g., Z=Z'+m).

Furthermore, as described above, information for the minimum required time from the last timing of the CSI-RS to the transmission timing of the CSI may be reported, by the terminal, to the base station as UE capability information.

Furthermore, as described above, the CSI-RS is configured to be aperiodically transmitted, that is, an aperiodic CSI-RS, and the DCI scheduling the CSI-RS may be triggering DCI for the CSI-RS. In this case, information for the minimum required time between a DCI triggering the CSI-RS and a reception of the CSI-RS (i.e. the decoding time for the DCI scheduling the CSI-RS) may be reported, by the terminal, to the base station as UE capability information.

Furthermore, as described above, the number of CSI processing units occupied for the CSI reporting (e.g., CSI reporting configured for beam management and/or beam reporting use, that is, L1-RSRP report) may be set to 1.

In relation to this, in an implementation aspect, the operation of the above-described terminal may be specifically implemented by the terminal device (e.g. 100 and/or 200) shown in FIGS. 15 to 18 of this disclosure. For example, the operation of the above-described terminal may be performed by the processor (e.g. 102 and/or 202) and/or the radio frequency (RF) unit (or module) (e.g. 106 and/or 206).

In a wireless communication system, a terminal that receives a data channel (e.g., PDSCH) may include a transmitter for transmitting radio signals, a receiver for receiving radio signals, and a processor functionally connected to the transmitter and the receiver. In this case, the transmitter and the receiver (or transceiver) may be denoted as an RF unit (or module) for transmitting and receiving radio signals.

For example, the processor may control the RF unit to receive DCI triggering CSI reporting (from a base station). In this case, the CSI reporting may be aperiodic CSI reporting.

Furthermore, the CSI reporting may be CSI reporting for beam management and/or beam reporting use. For example, reporting information of the CSI reporting may be any one of i) a CSI-RS resource indicator (CRI) and reference signal received power (RSRP), ii) a synchronization signal block (SSB) identifier and RSRP, or iii) no report.

The processor may control the RF unit to receive at least one CSI-RS (i.e., configured and/or indicated for the CSI reporting) for the CSI reporting (from the base station). For example, as shown in FIG. 9, the CSI-RS may be a CSI-RS received after timing at which the DCI triggering CSI reporting is received and prior to CSI reporting timing.

The processor may control the RF unit to transmit, to the base station, CSI calculated based on the CSI-RS. For example, the processor may control L1-RSRP report measured based on the CSI-RS so that the L1-RSRP report is performed on the base station.

In this case, a minimum required time for the CSI reporting (e.g., a Z value in the example 3 of the second implementation) may be configured based on i) a minimum required time (e.g., a Z' value in the example 3 of the second implementation) from the last timing of the CSI-RS to the transmission timing of the CSI and ii) a decoding time for DCI scheduling the CSI-RS (e.g., an m value in the example 3 of the second implementation). For example, the minimum required time for the CSI reporting may be configured as the sum of i) a minimum required time from the last timing of the CSI-RS to the transmission timing of the CSI and ii) a minimum required time between a DCI triggering the CSI-RS and a reception of the CSI-RS (i.e. a decoding time for DCI scheduling the CSI-RS) (e.g., Z=Z'+m).

Furthermore, as described above, information for the minimum required time from the last timing of the CSI-RS to the transmission timing of the CSI may be reported, by the terminal, to the base station as UE capability information.

Furthermore, as described above, the CSI-RS is configured to be aperiodically transmitted, that is, an aperiodic CSI-RS, and the DCI scheduling the CSI-RS may be triggering DCI for the CSI-RS. In this case, information for the minimum required time between a DCI triggering the CSI-RS and a reception of the CSI-RS (i.e. the decoding time for the DCI scheduling the CSI-RS) may be reported, by the terminal, to the base station as UE capability information.

Furthermore, as described above, the number of CSI processing units occupied for the CSI reporting (e.g., CSI reporting configured for beam management and/or beam reporting use, that is, L1-RSRP report) may be set to 1.

As an operation is performed as described above, unlike normal CSI reporting, in the case of L1-RSRP report used for beam management and/or beam reporting use, efficient Z value setting and CSI processing unit occupancy may be performed.

Figure 12:
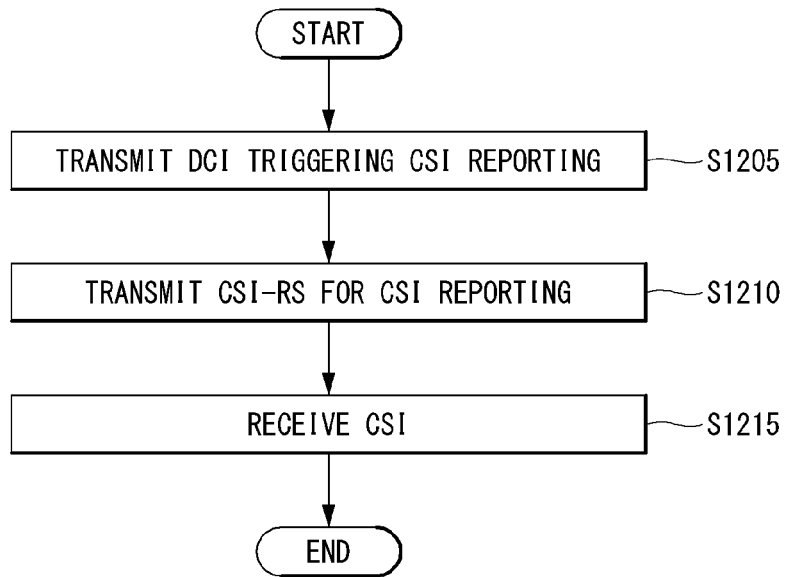
FIG. 12 shows an example of an operating flowchart of a base station receiving channel state information according to some implementations of this disclosure.

FIG. 12 shows an example of an operating flowchart of a base station receiving channel state information according to some implementations of this disclosure. FIG. 12 is merely for convenience of description and does not limit the scope of the present disclosure.

Referring to FIG. 12, a case where a terminal uses the examples described in the second implementation in performing L1-RSRP report is assumed. Particularly, a Z value and/or Z' value reported as UE capability information may be determined and/or configured based on the examples described in the second implementation (e.g., the example 3 of the second implementation).

The base station may transmit DCI triggering CSI reporting (to the terminal) (S1205). In this case, the CSI reporting may be aperiodic CSI reporting.

Furthermore, the CSI reporting may be CSI reporting for beam management and/or beam reporting use. For example, reporting information of the CSI reporting may be any one of i) a CSI-RS resource indicator (CRI) and reference signal received power (RSRP), ii) a synchronization signal block (SSB) identifier and RSRP, or iii) no report.

The base station may transmit at least one CSI-RS (i.e., configured and/or indicated for the CSI reporting) for the CSI reporting (to the terminal) (S1210). For example, as shown in FIG. 9, the CSI-RS may be a CSI-RS transmitted after the DCI in step S1205 and prior to CSI reporting timing.

The base station may receive CSI calculated based on the CSI-RS from the terminal (S1215). For example, the terminal may perform L1-RSRP report, measured based on the CSI-RS, on the base station.

In this case, a minimum required time for the CSI reporting (e.g., a Z value in the example 3 of the second implementation) may be configured based on i) a minimum required time (e.g., a Z' value in the example 3 of the second implementation) from the last timing of the CSI-RS to the transmission timing of the CSI and ii) a decoding time for DCI scheduling the CSI-RS (e.g., an m value in the example 3 of the second implementation). For example, the minimum required time for the CSI reporting may be configured as the sum of i) a minimum required time from the last timing of the CSI-RS to the transmission timing of the CSI and ii) a minimum required time between a DCI triggering the CSI-RS and a reception of the CSI-RS (i.e. a decoding time for DCI scheduling the CSI-RS) (e.g., Z=Z'+m).

Furthermore, as described above, information for the minimum required time from the last timing of the CSI-RS to the transmission timing of the CSI may be reported, by the terminal, to the base station as UE capability information.

Furthermore, as described above, the CSI-RS is configured to be aperiodically transmitted, that is, an aperiodic CSI-RS, and the DCI scheduling the CSI-RS may be triggering DCI for the CSI-RS. In this case, information for the decoding time for the DCI scheduling the CSI-RS may be reported, by the terminal, to the base station as UE capability information.

Furthermore, as described above, the number of CSI processing units occupied for the CSI reporting (e.g., CSI reporting configured for beam management and/or beam reporting use, that is, L1-RSRP report) may be set to 1.

As an operation is performed as described above, unlike normal CSI reporting, in the case of L1-RSRP report used for beam management and/or beam reporting use, efficient Z value setting and CSI processing unit occupancy may be performed.

In relation to this, in an implementation aspect, the operation of the above-described base station may be specifically implemented by the base station device (e.g. 100 and/or 200) shown in FIGS. 15 to 18 of this disclosure. For example, the operation of the above-described base station may be performed by the processor (e.g. 102 and/or 202) and/or the radio frequency (RF) unit (or module) (e.g. 106 and/or 206).

In a wireless communication system, the base station that transmits a data channel (e.g., PDSCH) may include a transmitter for transmitting radio signals, a receiver for receiving radio signals, and a processor functionally connected to the transmitter and the receiver. In this case, the transmitter and the receiver (or transceiver) may be denoted as an RF unit (or module) for transmitting and receiving radio signals.

For example, the processor may control the RF unit to transmit DCI triggering CSI reporting (to a terminal). In this case, the CSI reporting may be aperiodic CSI reporting.

Furthermore, the CSI reporting may be CSI reporting for beam management and/or beam reporting use. For example, reporting information of the CSI reporting may be any one of i) a CSI-RS resource indicator (CRI) and reference signal received power (RSRP), ii) a synchronization signal block (SSB) identifier and RSRP, or iii) no report.

The processor may control the RF unit to transmit at least one CSI-RS for CSI reporting (i.e., configured and/or indicated for the CSI reporting) (to the terminal). For example, as shown in FIG. 9, the CSI-RS may be a CSI-RS transmitted after timing the DCI triggering CSI reporting is received and prior to CSI reporting timing.

The processor may control the RF unit to receive CSI, calculated based on the CSI-RS, from the terminal. For example, the terminal may perform L1-RSRP report, measured based on the CSI-RS, on a base station.

In this case, a minimum required time for the CSI reporting (e.g., a Z value in the example 3 of the second implementation) may be configured based on i) a minimum required time (e.g., a Z' value in the example 3 of the second implementation) from the last timing of the CSI-RS to the transmission timing of the CSI and ii) a decoding time for DCI scheduling the CSI-RS (e.g., an m value in the example 3 of the second implementation). For example, the minimum required time for the CSI reporting may be configured as the sum of i) a minimum required time from the last timing of the CSI-RS to the transmission timing of the CSI and ii) a minimum required time between a DCI triggering the CSI-RS and a reception of the CSI-RS (i.e. a decoding time for DCI scheduling the CSI-RS) (e.g., Z=Z'+m).

Furthermore, as described above, information for the minimum required time from the last timing of the CSI-RS to the transmission timing of the CSI may be reported, by the terminal, to the base station as UE capability information.

Furthermore, as described above, the CSI-RS is configured to be aperiodically transmitted, that is, an aperiodic CSI-RS, and the DCI scheduling the CSI-RS may be triggering DCI for the CSI-RS. In this case, information for the decoding time for the DCI scheduling the CSI-RS may be reported, by the terminal, to the base station as UE capability information.

Furthermore, as described above, the number of CSI processing units occupied for the CSI reporting (e.g., CSI reporting configured for beam management and/or beam reporting use, that is, L1-RSRP report) may be set to 1.

As an operation is performed as described above, unlike normal CSI reporting, in the case of L1-RSRP report used for beam management and/or beam reporting use, efficient Z value setting and CSI processing unit occupancy may be performed.

Third Implementation

Furthermore, a method of separately setting CSI reference resources for calculation of L-RSRP used for the aforementioned beam reporting as well as normal CSI reference resources for CSI calculation can be considered. Tables 7 and 8 show an example of setting related to the CSI reference resources for CSI calculation.

TABLE 7

CSI reference resource definition

CSI reference resources for a serving cell are defined as follows.
- CSI reference resources are defined by a downlink physical resource block group corresponding to a band related to a derived CQI value in the frequency domain.
- CSI reference resources for CSI reporting in uplink slot n are defined by single downlink n-n_CQI ref for a UE composed of a single CSI resource set for a serving cell in the time domain,
  - In the case of periodic and semi-persistent CSI reporting,
    (A) when a single CSI-RS resource is configured for channel measurement, n CQI ref is the smallest value among values greater than or equal to 4·2^(min(u DL,u UL)), such that it corresponds to a valid downlink slot, or
    (B) when multiple CSI-RS resources are configured for channel measurement, n CQI ref is a smallest value among values greater than or equal to 5·2 ^ (min (u DL, u UL)), such that it corresponds to a valid downlink slot.

TABLE 7-continued

- In the case of aperiodic CSI reporting,
    When a UE is instructed through DCI to report CSI in the same slot as that for CSI request, n_CQI_ref is set such that it is positioned in the same valid downlink slot as that for CSI request corresponding to a reference resource, and if not, nCQI_ref may be a value equal to or greater than $\lfloor Z' / N_{symb}^{slot} \rfloor$ such that slot n-n_CQI_ref corresponds to a valid downlink slot. Here, Z' can correspond to a minimum time period from a time when a measurement resource related to CSI reporting is received to a time when a UE actually performs CSI reporting, as described above.
    - When periodic or semi-persistent CSI-RS/CSI-IM is used for channel/interference measurement, a UE is not expected to measure channel/interference on the CSI-RS/CSI-IM whose last OFDM symbol is received up to Z symbols before transmission time of the first OFDM symbol of the aperiodic CSI reporting.

TABLE 8

A slot in a serving cell is considered to be a valid downlink slot if:
- it comprises at least one higher layer composed of downlink or flexible symbol (i.e., for downlink or uplink), and
- (C) it does not fall within a configured measurement gap for that UE, and
- the active DL BWP in the slot is the same as the DL BWP for which the CSI reporting is performed, and
- (D) there is at least one CSI-RS transmission occasion for channel measurement and CSI-RS and/or CSI-IM occasion for interference measurement in DRS Active Time no later than CSI reference resource for which the CSI reporting is performed.

If there is no valid downlink slot for the CSI reference resource corresponding to a CSI report setting in a serving cell, CSI reporting is omitted for the serving cell in uplink slot n.
When deriving CSI feedback, the UE is not expected that a NZP CSI-RS resource for channel measurement overlaps with CSI-IM resource for interference measurement or NZP CSI-RS resource for interference measurement.

A method of defining CSI reference resources for L1-RSRP reporting as follows with reference to the CSI reference resource configuration in Tables 7 and 8 is proposed. For convenience of description, a CIS reference resource for L1-RSRP reporting is referred to as an L1-RSRP reference resource in the disclosure.

With respect to the time domain of the L1-RSRP reference resource, periodic and/or semi-persistent L1-RSPR reporting may conform to one of method 1 and method 2 below instead of following (A) and (B) in Table 7.

Method 1)
When one or multiple CSI-RS resources (or SSB resources) are configured for a UE for L1-RSRP reporting, (all) n_CQI_ref can be defined as the smallest value among values greater than or equal to $4\cdot 2^{(min(\mu\_DL,\mu\_UL))}$ such that it corresponds to a value downlink slot.

Method 2)
When one or multiple CSI-RS resources (or SSB resources) are configured for the UE for L1-RSRP reporting, (all) n_CQI_ref can be defined as the smallest value among values greater than or equal to $F\cdot 2^{(min(\mu\_DL,\mu\_UL))}$ such that it corresponds to a value downlink slot. Here, F is a constant smaller than 4 (e.g., F=1, 2 or 3).

Since L1-RSRP reporting has lower computational complexity than CSI reporting, the method (above-described method 1) of fixing and using $4\cdot 2^{(min(\mu\_DL,\mu\_UL))}$ irrespective of the number of resources used for channel measurement may be efficient.

And/or L1-RSRP reporting has lower computational complexity than CSI reporting, and thus the method (above-described method 2) of fixing and using $F\cdot 2^{(min(\mu\_DL,\mu\_UL))}$ smaller than $4\cdot 2^{(min(\mu\_DL,\mu\_UL))}$ irrespective of the number of resources used for channel measurement may be efficient.

Details corresponding to (C) of Table 8 may not be used as a condition for verifying validity for L1-RSRP reporting. Alternatively, details corresponding to (C) of Table 8 may not be used as a condition for verifying validity for L1-RSRP reporting only in the case of the following example. For example, when L1-RSRP reporting is not set for each of multiple carrier components (CCs) or multiple bandwidth parts (BWPs) (e.g., BWP 1, 2, 3 and 4) and L1-RSRP reporting is set only for one (e.g., BWP 1) of the multiple CCs and/or multiple BWPs, the L1-RSRP reference resource can also be configured in a measurement gap. For example, the above case may be a case in which it is assumed that BWPs 2, 3 and 4 have a QCLD relationship with CSI-RS and/or SSB used for L1-RSRP calculation of BWP 1.

In the case of L-RSRP, interference measurement is not necessary and thus details related to interference measurement resources in the part D of Table 8 may not be valid for L1-RSRP. In view of this, in the case of L1-RSRP, the part D of Table 8 can be changed to "There is at least one CSI-RS and/or SSB transmission occasion for L1-RSRP measurement before a CSI reference resource for which the CSI reporting is performed." Similarly, in definition of the L1-RSRP reference resource, (all) details related to interference measurement used in definition of CSI reference resources for CSI calculation (e.g., Table 7 and/or Table 8) may not be valid.

Furthermore, when the L1-RSRP reference resource is configured on the basis of Table 7 and Table 8, the L1-RSRP reference resource can be configured as downlink slot n-n_CQI_ref according to definition in the time domain. Here, although whether n_CQI_ref is valid may be used in the process of calculating n_CQI_ref, this may not need to be used because L1-RSRP reporting can perform only power measurement unlink CSI reporting. That is, n_CQI_ref for the L1-RSRP reference resource can be calculated on the assumption that all slots are valid.

Referring to Table 7 and Table 8, in the case of CSI reporting, a UE can configure a CSI reference resource according to a predefined (or preset) rule and calculate CSI on the basis of the configured CSI reference resource. Further, setting for a reference resource (i.e., L1-RSRP reference resource) can be considered for L1-RSRP reporting, as described above.

On the other hand, L1-RSRP reporting completes calculation in a simpler power measurement step than that for CSI reporting and is not related to PDSCH transmission, and thus a UE may calculate measurement information for L1-RSRP reporting without setting for the L1-RSRP reference resource.

When a UE calculate L1-RSRP through a periodic and/or semi-persistent CSI-RS and/or SSB, a problem that application of the aforementioned value Z' is uncertain may be generated. The value Z' may refer to a minimum time required from a timing and/or a symbol at which a reference resource (i.e., CSI-RS and/or SSB) used for power measurement is received to a timing and/or a symbol at which L1-RSRP is reported. In the case of a periodic and/or semi-persistent CSI-RS and/or SSB, the CSI-RS and/or SSB are periodically present multiple times and thus a base station cannot be aware of a CSI-RS and/or SSB used for a UE to perform power measurement. Accordingly, the UE and the base station may differently construe whether L1-RSRP reporting satisfies the value Z' (i.e., whether a minimum value required from a CSI-RS and/or SSB used for power measurement to a reporting time is equal to or greater than the value Z'). To solve such ambiguity, the following method is proposed.

When a UE calculates L1-RSRP through a periodic and/or semi-persistent CSI-RS and/or SSB, the UE and a base station may be configured to no more use the aforementioned Z' condition. That is, the Z condition is used but the Z' condition is ignored and L1-RSRP is calculated and the calculated L1-RSR) can be reported. Alternatively, the UE may calculate and report L1-RSRP on the assumption that the Z' condition is always satisfied. Furthermore, when L1-RSRP is calculated through an aperiodic CSI-RS and/or SSB, the UE can differently calculate and report L1-RSRP depending on whether the aforementioned Z condition and Z' condition are satisfied using the Z condition and Z' condition.

For example, when channel measurement is performed using a periodic and/or semi-persistent CSI-RS during CSI reporting, a CSI processing unit (CPU) can be configured as follows. The CPU(s) can occupy a plurality of OFDM symbols according to the following rule.

Periodic or semi-persistent CSI reporting using a periodic or semi-persistent CSI-RS can occupy CPU(s) from the first symbol of the earliest CSI-RS and/or CSI/IM resource (recent CSI-RS and/or CSI-IM occasion before corresponding CSI reference resource) for channel or interference measurement to, if possible, the last symbol of a PUSCH and/or a PUCCH carrying the corresponding report.

When setting for the L1-RSRP reference resource is not considered, as described above, a start time and an end time of CPU occupation can be set as follows.

In the case of L1-RSRP reporting using periodic or semi-persistent CSI-RS(s) and/or SSB(s), when it is assumed that a UE reports L1-RSRP information in a slot n, a CPU occupation start time may be the first symbol of the earliest CSI-RS and/or SSB from among most recent periodic or semi-persistent CSI-RS(s) and/or SSB(s) received at times before a slot n-C.

In the case of L1-RSRP reporting using periodic or semi-persistent CSI-RS(s) and/or SSB(s), a CPU occupation end time may be the last symbol of a PUSCH and/or a PUCCH carrying L1-RSRP report.

In the above-described method, the value C refers to a specific constant value and can be determined as a function of symbol Z'. For example, the value C can be determined as flooring (e.g., rounding off to a whole number) of Z'/(the number of OFDM symbols in the slot) (i.e., flooring (Z/N^slot_symbol)). For example, the value C can be set to flooring (Z/N^slot_symbol)+1. In this case, a minimum time for L1-RSRP calculation can be increased and implementation of a UE can be facilitated. For example, the value C can be determined as ceiling (e.g., rounding off) of Z'/(the number of OFDM symbols in the slot) (i.e., ceiling(Z/N^slot_symbol)). In this case, a minimum time for L1-RSRP calculation can be increased and implementation of a UE can be facilitated. For example, the value C can be set to ceiling(Z/N^slot_symbol)+1. In this case, a minimum time for L1-RSRP calculation can be increased. For example, the value C may be set to a specific value. The value C can be determined as 4 with reference to the face that n_CQI_ref is equal to or greater than 4 in conventional systems (e.g., LTE system). Alternatively, the value C may be determined as a value (e.g., 2) less than 4 because L1-RSRP reporting has low calculation complexity while referring to the fact that n_CQI_ref is equal to or greater than 4 in conventional systems.

Fourth Implementation

In the method of determining the value Z (i.e., minimum required time for L1-RSRP reporting) for L1-RSRP reporting described in the second implementation, the value Z' can represent the last timing and/or symbol at which a measurement resource is received from to the first timing and/or symbol at which CSI is reported. For example, when Z=m+Z' as in the second implementation, the value Z' can correspond to a time from the last timing and/or symbol at which a channel measurement resource (CMR) and/or an interference measurement resource (IMR) is received to the first timing and/or symbol at which CSI is reported. That is, a UE can perform channel measurement and/or interference measurement for the time corresponding to the value Z', calculate CSI, and then encode the calculated CSI to determine/generate a UL transmission signal.

Furthermore, the value Z can represent a time from the last timing and/or symbol at which a PDCCH (i.e., DCI) which triggers CSI is received to the first timing and/or symbol at which the CSI is reported, as described above. That is, a UE can perform channel measurement and/or interference measurement for the time corresponding to the value Z, calculate CSI, and then encode the calculated CSI to determine/generate a UL transmission signal.

Furthermore, the value m can represent a time required for a UE to decode DCI and switch an Rx beam through which the DCI is received to an Rx beam through which a CSI-RS indicated by the DCI is received, as described above. Here, since the Rx beam switching time is not long (e.g., 1 symbol or less), the value m represents a time required for decoding of the DCI. Accordingly, it may be desirable to set the value Z by adding the value m corresponding to a decoding time and a (e.g., a value corresponding to 1 symbol or less) to the value Z'. Here, the values Z, Z' and m can be defined in units of OFDM symbols.

However, the value m can be defined only for 60 kHz and/or 120 kHz subcarrier spacings, and thus it may be difficult to apply the above-described method (i.e., Z=Z'+m) in order to determine the value Z in the case of 15 kHz and/or 30 kHz subcarrier spacings.

A method of applying the above-described method (i.e., Z=Z'+m) on the assumption that the value m in the case of 15 kHz and/or 30 kHz subcarrier spacings is the same as the value m in the case of a 60 kHz subcarrier spacing is conceivable. For example, absolute times required for transmission of 1 symbol in the case of 15 kHz and/or 30 kHz subcarrier spacings are quadruple and double of that in the case of 60 kHz subcarrier spacing. Accordingly, when a DCI decoding time is m symbols in the case of the subcarrier spacing of 60 kHz, a DCI decoding time of less than m symbols may be required in the case of 15 kHz and/or 30 kHz subcarrier spacings. Therefore, when it is assumed that the value m in the case of 15 kHz and/or 30 kHz subcarrier spacings is the same as the value m in the case of 60 kHz subcarrier spacing, Z is defined as a value greater than an actually required minimum CSI processing time when the above-described method (i.e., Z=Z'+m) is applied and thus UE can be easily implemented.

Further, a method of obtaining the value Z by scaling the value m in case of 15 kHz and/or 30 kHz subcarrier spacings to a value obtained by dividing the value m in the case of 60 kHz subcarrier spacing by 4 or 2 and applying the above-described method (i.e., Z=Z'+m) thereto in consideration of transfer time increase due to subcarrier spacing reduction is also conceivable.

If completion of CSI processing performed by a UE for the time Z (i.e., Z=Z'+m) defined according to the above-described method lays a burden on UE implementation, a method of providing a specific margin value is conceivable. For example, when it is difficult for the UE to complete CSI processing (e.g., all processes necessary to report CSI such as decoding for triggering DCI, channel and/or interference measurement, CSI calculation, and CSI encoding) for the time Z, the value Z can be defined as the sum of the values Z', m and C. Here, the value C is a constant value and can be defined in units of symbols.

Furthermore, with respect to L1-RSRP reporting, UE capability information as shown in Table 9 can be set. Table 9 shows an example of UE capability information related to L1-RSRP reporting.

TABLE 9

| | |
|---|---|
| #2-25. Beam reporting timing | |
| The number of symbols, $X_i$, between the last symbol of SSB/CSI-RS and the first symbol of the transmission channel containing beam report is at least $RB_i$, where i is the index of SCS, i = 1, 2, 3, 4 corresponding to 15, 30, 60, 120 kHz SCS. | |
| Need for gNB to know whether the feature is supported by the UE (what happens if gNB does not know?) | Yes |
| Consequences if the feature is not supported by the UE | Beam reporting time capability is not known by gNB |
| Note | — |
| RAN WG recommendation | Candidate value sets: $X_1$ is {2, 4, 8}/$X_2$ is {4, 8, 14}/$X_3$ is {8, 14, 28}/$X_4$ is {14, 28, 56} |
| #2-28. A-CSI-RS beam switching timing | |
| Minimum time between the DCI triggering of AP-CSI-RS and aperiodic CSI-RS transmission shall be at least KBi symbols. (Symbols measured from last symbol containing the indication to first symbol of CSI-RS), where i is the index of SCS, I = 1, 2 corresponding to 60, 120 kHz SCS. | |
| Need for gNB to know whether the feature is supported by the UE (what happens if gNB does not know?) | Yes |
| Consequences if the feature is not supported by the UE | No recommendation on the desired beam switching timing |
| Note | [Note: any value larger than 56 is not supported in RRC configuration now.] |
| RAN WG recommendation | Only applicable to FR2 Candidate values: {14, 28, 48, 224, 336} |

For example, UE capability 2-25 and UE capability 2-28 can be set as UE capability information with respect to L1-RSRP reporting as shown in Table 9. Here, UE capability 2-25 may be UE capability information about aperiodic beam reporting timing related to the aforementioned value Z'. In addition, UE capability 2-28 may be UE capability information about a minimum time between DCI triggering of an aperiodic CSI-RS and aperiodic CSI-RS reception (or transmission) with respect to the aforementioned value m.

Hereinafter, the UE capability information (e.g., UE capability 2-25) about an aperiodic beam reporting timing is referred to as first UE capability information and the UE capability information (e.g., UE capability 2-28) about a minimum time between DCI triggering of an aperiodic CSI-RS and aperiodic CSI-RS reception (or transmission) is referred to as second UE capability information for convenience of description.

When a UE does not support (analog) Rx beam switching for some or all subcarrier spacings (e.g., 60 kHz, 120 kHz, and the like) in a high frequency band (e.g., Frequency Range 2 (FR2)), the UE may not report (or transmit) the second UE capability information to a base station. Here, the above-described Z setting method (e.g., Z=Z'+m) may be invalid when the UE does not report the second UE capability information to the base station because the second UE capability information corresponding to the aforementioned value m. Furthermore, in the case of a low frequency band (e.g., Frequency Range 1 (FR1)), the UE does not report the second UE capability information to the base station and thus the above-described Z setting method (e.g., Z=Z'+m) may be invalid In view of this, the following methods are conceivable in order to calculate a minimum required time (e.g., the value Z) for L1-RSRP reporting.

Method 1)

When a UE reports (transmits) the second UE capability information (i.e., a minimum time between DCI triggering of an aperiodic CSI-RS and aperiodic CSI-RS reception (or transmission)) to a base station, a method of setting Z such that the above-described Z setting method (e.g., Z=Z'+m) is used for a corresponding subcarrier spacing is conceivable. This method may be extended and applied to the method of setting the value Z as the sum of the values Z', m and C.

For example, for a subcarrier spacing for which a UE does not report the second UE capability information (including the case of FR1), the UE can apply the above-described Z setting method (e.g., Z=Z'+m) on the assumption that a specific value from among specific candidate values is the value m. For example, the specific candidate values can be set to {14, 28, 48, 224, 336}. Values corresponding to 224 and 336 from among the specific values may be unsuitable because they include an Rx beam (and/or panel) activation time in addition to a time required for DCI decoding. Accordingly, the value m is determined as one of {14, 28, 48} and the UE can be configured to perform L1-RSRP reporting more rapidly by assuming the value m to be 4 that is the smallest value. Alternatively, the UE can be sufficiently guaranteed a minimum time required for L1-RSRP calculation by assuming the value m to be 48 that is the largest value, and facilitation in UE implementation can be improved.

Furthermore, in the above-described method 1), a base station may set and/or indicate, to the UE, whether to set the value Z (i.e., Z=Z'+m) using the value reported by the UE as the value m or set the value Z (i.e., Z=Z'+m) on the assumption that the value m is a specific value (while ignoring the value reported by the UE). In this case, the aforementioned setting and/or indication can be performed through higher layer signaling and the UE can perform L1-RSRP reporting according to the set and/or indicated method. Further, the base station may determine the value m and set and/or indicate the value m to the UE.

Method 2)

In the above-described method 1), the above-described Z setting method (e.g., Z=Z'+m) is used for a corresponding subcarrier spacing when a UE reports (or transmits) the second UE capability information (i.e., a minimum time between DCI triggering of an aperiodic CSI-RS and aperiodic CSI-RS reception (or transmission)) to a base station and the value Z is determined if not.

In the method 2), a method of differently determining Z in response to a reported value m even when the UE reports the second UE capability information to the base station is proposed. That is, the method of determining the value Z may depend on the value for "the minimum time between DCI triggering of an aperiodic CSI-RS and aperiodic CSI-RS reception (or transmission)" reported by the UE to the base station. For example, a specific threshold value (e.g., an upper bound value) with respect to calculation of the value Z can be set and the value Z can be determined on the basis of the specific threshold value when the calculated value Z is excessively large.

For example, the value Z is determined as the sum of Z' and m when m is within {14, 28, 48}, whereas the value Z is determined as the sum of Z' and a specific value when m is within {224, 336}. Here, the specific value may be a specific constant or a value according to a predetermined mathematical expression (e.g., a specific constant—Z'). This is because a value corresponding to 224 or 336 includes an Rx beam (and/or panel) activation time as well as a time required for DCI decoding and thus L1-RSRP reporting may be (excessively) delayed from a DCI reception time as the value Z (excessively) increases when the value is applied to the value Z. In this case, accordingly, a method of calculating the value Z (Z=Z'+m) by setting, defining and/or determining an upper bound value related to calculation of the value Z and replacing the value m reported by the UE with the upper bound value is conceivable.

For example, the aforementioned specific value and/or specific threshold value (e.g., upper bound value) can be determined as one of {14, 28, 48}. The UE can be configured to perform L1-RSRP reporting more rapidly by assuming the value m to be 14 that is the smallest value. Alternatively, the UE can be sufficiently guaranteed a minimum time required for L1-RSRP calculation by assuming the value m to be 48 that is the largest value, and facilitation in UE implementation can be improved.

Figure 13:
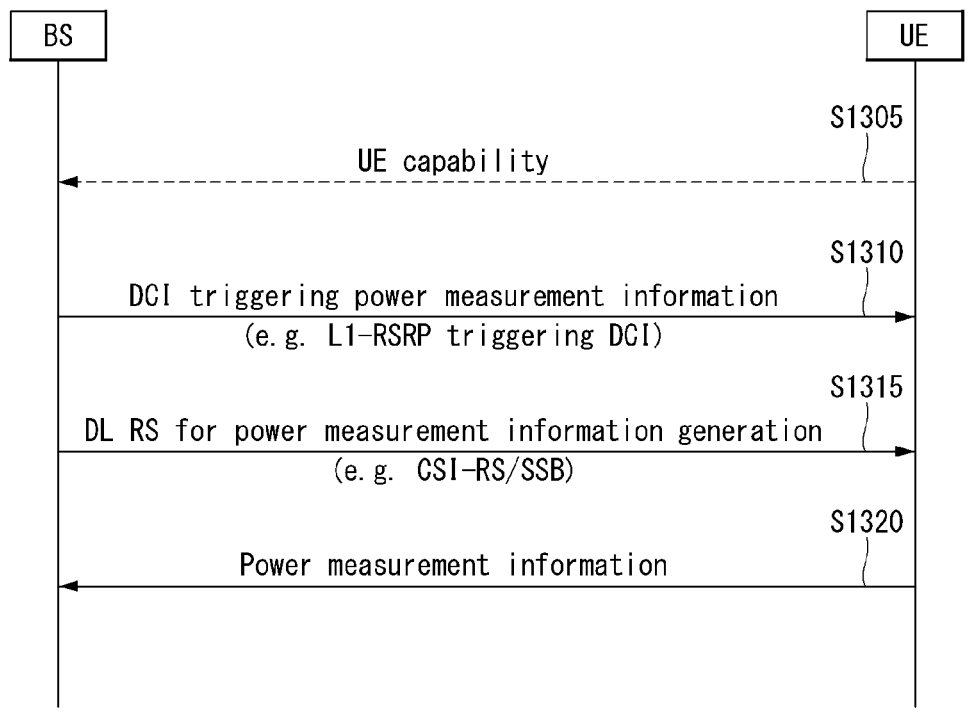
FIG. 13 shows an example of signaling between a terminal and a base station which transmit and receive power measurement information related to beam reporting in a wireless communication system according to some implementations of this disclosure.

FIG. 13 shows an example of signaling between a UE and a base station (BS) which transmit and receive power measurement information with respect to beam reporting in a wireless communication system according to some implementations of the disclosure. FIG. 13 is for convenience of description and does not limit the scope of the disclosure. Further, some steps shown in FIG. 13 may be omitted.

Referring to FIG. 13, it is assumed that the UE uses the methods and/or examples proposed in the second and fourth implementations when reporting (transmitting) power measurement information (e.g., the aforementioned L1-RSRP) with respect to beam reporting to the BS. For example, the power measurement information with respect to beam reporting may include any one of i) CSI-RS resource indicator (CRI) and reference signal received power (RSRP), ii) synchronization signal block (SSB) identifier and RSRP and iii) no report. Further, a subcarrier spacing for the power management information can be set to a high frequency band (e.g., 60 kHz, 120 kHz, or the like).

The UE can transmit UE capability information to the BS with respect to reporting of the power measurement information related to beam reporting to the BS (S1305). In other words, the BS can receive the UE capability information from the UE with respect to reporting of the power measurement information related to beam reporting. For example, the UE capability information related to L1-RSRP reporting may include UE capability information (e.g., first UE capability information) about an aperiodic beam reporting timing with respect to the aforementioned value Z' and UE capability information (e.g., second UE capability information) about a minimum time between DCI triggering of an aperiodic CSI-RS and aperiodic CSI-RS reception (or transmission) with respect to the aforementioned value m, as in the above-described second and fourth implementation.

For example, the operation of the UE (e.g., 100 and/or 200 in FIGS. 15 to 18) to transmit the UE capability information to the BS (e.g., 100 and/or 200 in FIGS. 15 to 18) in step S1305 can be implemented by a device in FIGS. 15 to 18 which will be described below. For example, referring to FIG. 15, at least one processor 102 can control at least one transceiver 106 and/or at least one memory 104 such that the UE capability information is transmitted, and the at least one transceiver 106 can transmit the UE capability information to the BS.

Similarly, the operation of the BS (e.g., 100 and/or 200 in FIGS. 15 to 18) to receive the UE capability information from the UE (e.g., 100 and/or 200 in FIGS. 15 to 18) in step S1305 can be implemented by a device in FIGS. 15 to 18 which will be described below. For example, referring to FIG. 15, the at least one processor 102 can control the at least one transceiver 106 and/or the at least one memory 104 such that the UE capability information is received, and the at least one transceiver 106 can receive the UE capability information.

The UE can receive downlink control information (DCI) which triggers reporting of the power measurement information from the BS (S1310). In other words, the BS can transmit the DCI which triggers reporting of the power measurement information to the UE. For example, the UE can receive DCI which triggers aperiodic L1-RSRP reporting from the BS as in the above-described second and fourth implementations.

For example, the operation of the UE (e.g., 100 and/or 200 in FIGS. 15 to 18) to receive the DCI from the BS (e.g., 100 and/or 200 in FIGS. 15 to 18) in step S1310 can be implemented by a device in FIGS. 15 to 18 which will be described below. For example, referring to FIG. 15, the at least one processor 102 can control the at least one transceiver 106 and/or the at least one memory 104 such that the DCI is received, and the at least one transceiver 106 can receive the DCI from the BS.

Similarly, the operation of the BS (e.g., 100 and/or 200 in FIGS. 15 to 18) to transmit the DCI to the UE (e.g., 100 and/or 200 in FIGS. 15 to 18) in step S1310 can be implemented by a device in FIGS. 15 to 18 which will be described below. For example, referring to FIG. 15, the at least one processor 102 can control the at least one transceiver 106 and/or the at least one memory 104 such that the DCI is transmitted, and the at least one transceiver 106 can transmit the DCI to the UE.

The UE can receive a downlink reference signal for reporting of the power measurement information from the BS (S1315). In other words, the BS can transmit the downlink reference signal for reporting of the power measurement information. For example, the downlink reference signal may include a CSI-RS and/or a SSB as in the above-described second and fourth implementations. For example, when the CSI-RS is based on aperiodic operation in the time domain, the UE may additionally receive DCI which schedules (or triggers) the downlink reference signal from the BS.

For example, the operation of the UE (e.g., 100 and/or 200 in FIGS. 15 to 18) to receive the downlink reference signal from the BS (e.g., 100 and/or 200 in FIGS. 15 to 18) in step S1315 can be implemented by a device in FIGS. 15 to 18 which will be described below. For example, referring to FIG. 15, the at least one processor 102 can control the at least one transceiver 106 and/or the at least one memory 104 such that the downlink reference signal is received, and the at least one transceiver 106 can receive the downlink reference signal from the BS.

Similarly, the operation of the BS (e.g., 100 and/or 200 in FIGS. 15 to 18) to transmit the downlink reference signal to the UE (e.g., 100 and/or 200 in FIGS. 15 to 18) in step S1315 can be implemented by a device in FIGS. 15 to 18 which will be described below. For example, referring to FIG. 15, the at least one processor 102 can control the at least one transceiver 106 and/or the at least one memory 104 such that the downlink reference signal is transmitted, and the at least one transceiver 106 can transmit the downlink reference signal to the UE.

The UE can transmit power measurement information determined on the basis of the received downlink reference signal to the BS (S1320). In other words, the BS can receive the power measurement information determined on the basis of the received downlink reference signal from the UE. For example, the UE can transmit L1-RSRP information determined and/or calculated using a CSI-RS and/or an SSB to the BS as in the above-described second and fourth implementations.

Here, a minimum required time (e.g., the aforementioned value Z) for reporting of the power measurement information can be (i) calculated as the sum of a first minimum required time from the last timing of the downlink reference signal to a transmission timing of the power measurement information (e.g., the aforementioned value Z') and a second minimum required time between DCI triggering the downlink reference signal and reception of the downlink reference signal (e.g., the aforementioned value m) or (ii) calculated based on a pre-configured threshold value related to reporting of the power measurement information. For example, the minimum required time Z for L1-RSRP reporting can be calculated and/or determined as the sum of Z' and m as in the above-described second implementation. Alternatively, the minimum required time Z for L1-RSRP reporting may be calculated on the basis of a preset upper bound value as in the above-described fourth implementation.

For example, when the sum of the first minimum required time and the second minimum required time is greater than a specific value, the minimum required time for reporting of the power measurement information can be calculated on the basis of a threshold value preset with respect to reporting of the power measurement information.

For example, the operation of the UE (e.g., 100 and/or 200 in FIGS. 15 to 18) to transmit the power measurement information to the BS (e.g., 100 and/or 200 in FIGS. 15 to 18) in step S1320 can be implemented by a device in FIGS. 15 to 18 which will be described below. For example, referring to FIG. 15, the at least one processor 102 can control the at least one transceiver 106 and/or the at least one memory 104 such that the power measurement information is transmitted, and the at least one transceiver 106 can transmit the power measurement information to the BS.

Similarly, the operation of the BS (e.g., 100 and/or 200 in FIGS. 15 to 18) to receive the power measurement information from the UE (e.g., 100 and/or 200 in FIGS. 15 to 18) in step S1320 can be implemented by a device in FIGS. 15 to 18 which will be described below. For example, referring to FIG. 15, the at least one processor 102 can control the at least one transceiver 106 and/or the at least one memory 104 such that the power measurement information is received, and the at least one transceiver 106 can receive the power measurement information from the UE.

Furthermore, the number of CSI processing units (CPUs) used for reporting of the power measurement information (e.g., L1-RSRP reporting) can be set to 1 as in the above-described second implementation.

As mentioned above, the above-described signaling and operations between the BS and/or the UE (e.g., the first implementation/second implementation/third implementation/fourth implementation) can be implemented by a device (e.g., a device in FIGS. 15 to 18) which will be described below. For example, the BS (e.g., 100 and/or 200 in FIGS. 15 to 18) may correspond to a first wireless device and the UE may correspond to a second wireless device, and the opposite case may be considered as necessary.

For example, the above-described signaling and operations between the BS and/or the UE (e.g., the first implementation/second implementation/third implementation/fourth implementation) can be processed by one or more processors (e.g., 102 and/or 202) in FIGS. 15 to 18. Furthermore, the above-described signaling and operations between the BS and the UE (e.g., the first implementation/second implementation/third implementation/fourth implementation) may be stored in the form of commands/programs (e.g., instruction and executable code) for driving at least one processor (e.g., 102 and/or 202) in FIGS. 15 to 18 in a memory (e.g., one or more memories (e.g., 104 and/or 204) in FIGS. 15 to 18)).

Example of Communication System to which Disclosure is Applied

The various descriptions, functions, procedures, proposals, methods, and/or operational flowcharts of the present invention described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 14:
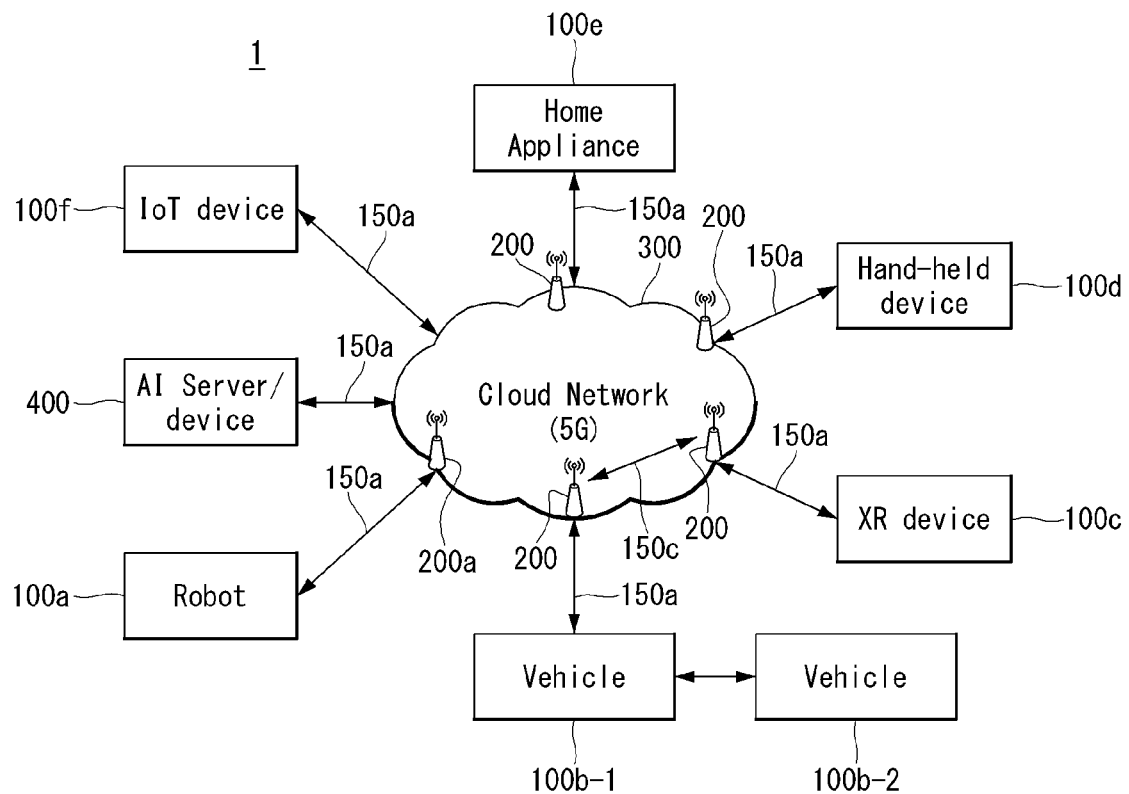
FIG. 14 illustrates a communication system 1 applied to this disclosure.

FIG. 14 illustrates a communication system 1 applied to the present invention.

Referring to FIG. 14, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Example of Wireless Devices to which Disclosure is Applied

Figure 15:
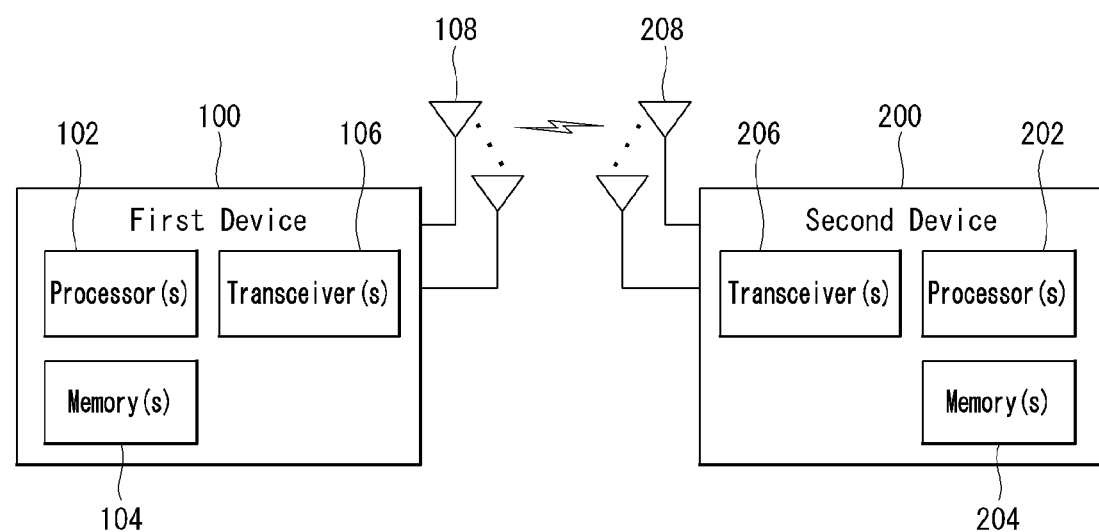
FIG. 15 illustrates wireless devices applicable to this disclosure.

FIG. 15 illustrates wireless devices applicable to the present invention.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit to which Disclosure is Applied

Figure 16:
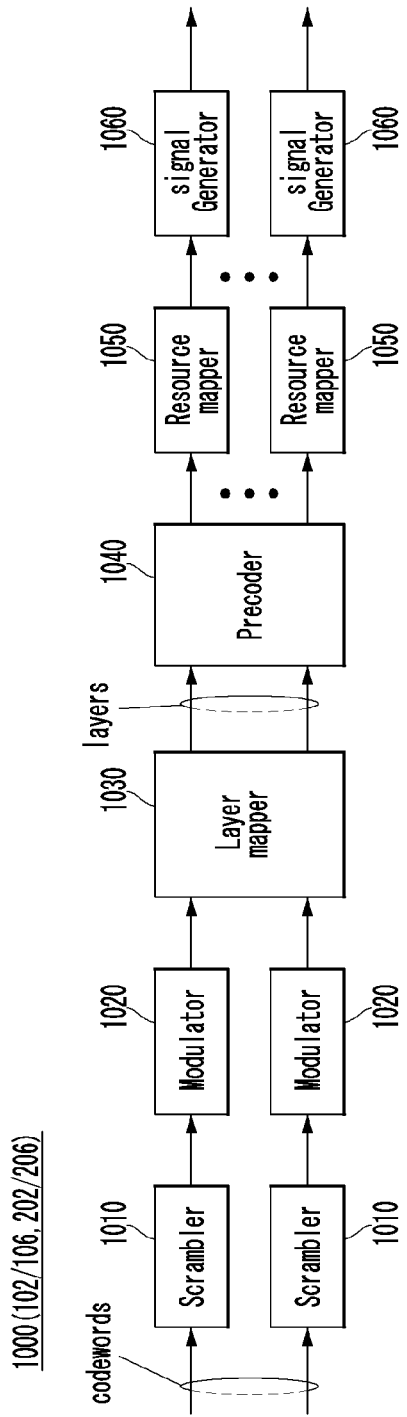
FIG. 16 illustrates a signal processing circuit for transmitted signals.

FIG. 16 illustrates a signal process circuit for a transmission signal.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Utilization of Wireless Devices to which Disclosure is Applied

Figure 17:
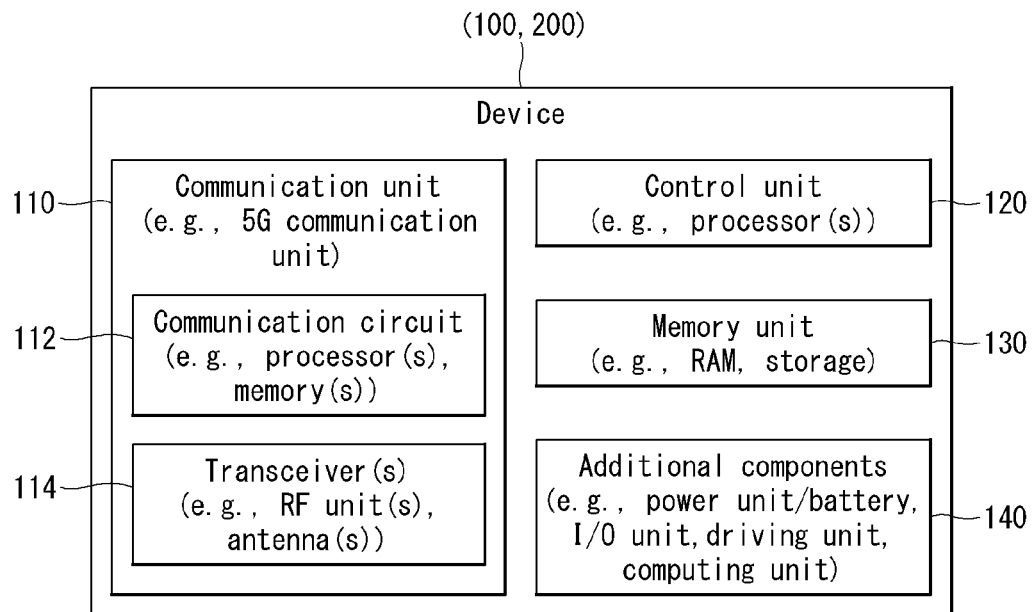
FIG. 17 shows another example of wireless devices applied to this disclosure, which can be implemented in various forms depending on use examples/services (refer to FIG. 14).

FIG. 17 illustrates another example of a wireless device applied to the present invention. The wireless device may be implemented in various forms according to a use-case/service (refer to FIG. 14).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 17 will be described in detail with reference to the drawings.

Example of Hand-Held Device to which Disclosure is Applied

Figure 18:
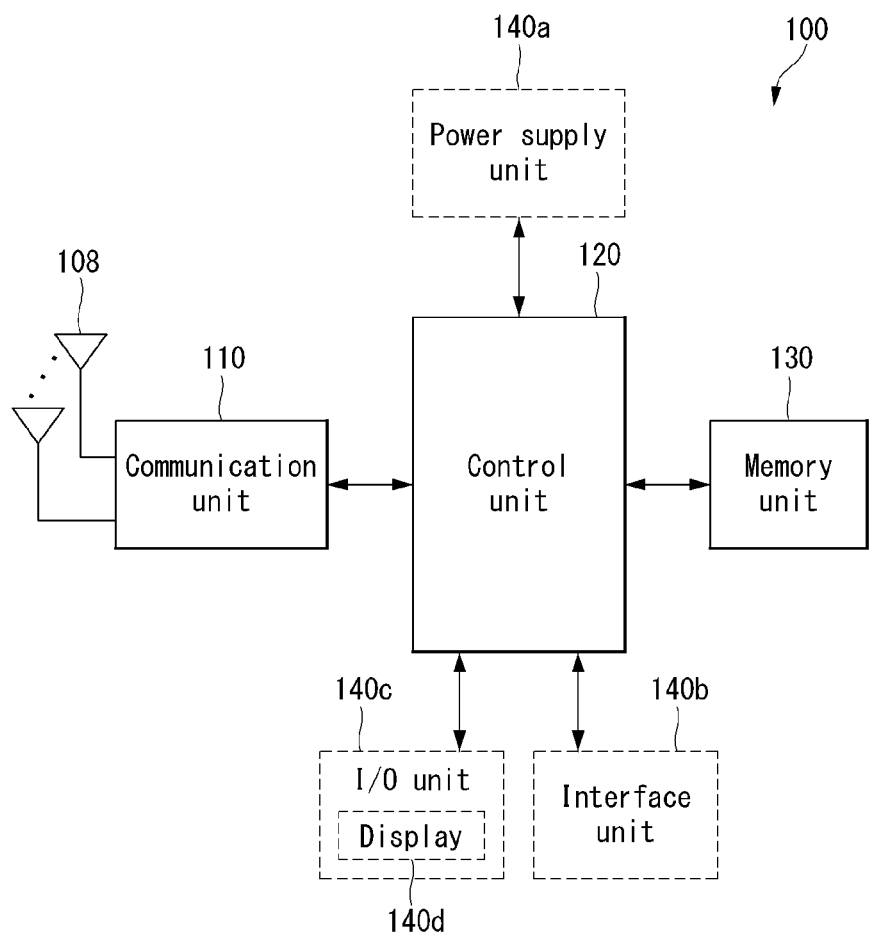
FIG. 18 illustrates a hand-held device applied to this disclosure.

FIG. 18 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

In this disclosure, the wireless device may be a base station, a network node, a transmission terminal, a reception terminal, a wireless device, a wireless communication device, a vehicle, a vehicle on which an automatic driving function has been mounted, a connected car, a drone (or unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field. For example, the drone may be a flight vehicle that flies by a wireless control signal without a person being on the flight vehicle. For example, the MTC device and the IoT device may be a device that does not require a person's direct intervention or manipulation, and may include a smart meter, a vending machine, a thermometer, a smart bulb, a door lock or a variety of sensors. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid or a device for a surgical procedure. For example, the security device may be a device installed to prevent a possible danger and to maintain safety, and may be a camera, CCTV, a recorder or a blackbox. For example, the FinTech device may be a device capable of providing financial services, such as mobile payment, and may be a payment device, point of sales (POS), etc. For example, the climate/environment device may include a device for monitoring or predicting the climate/environment.

In this disclosure, the terminal include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), a foldable device, and so on. For example, the HMD may be a display device of a form, which is worn on the head, and may be used to implement VR or AR.

The aforementioned implementations are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by means of amendment after the application is filed.

The implementations of the present disclosure may be achieved by various means, for example, hardware, firmware, software, or a combination thereof. In a hardware configuration, the methods according to the implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The scheme for transmitting and receiving channel state information in a wireless communication system of the present disclosure has been illustrated as being applied to a 3GPP LTE/LTE-A system and a 5G system (new RAT system), but may be applied to various other wireless communication systems.

What is claimed is:

1. A method of transmitting, by a user equipment (UE), power measurement information related to beam reporting in a wireless communication system, the method comprising:
receiving, by the user equipment, downlink control information (DCI) that triggers reporting of the power measurement information;
receiving, by the user equipment, a downlink reference signal for reporting of the power measurement information; and
transmitting, by the user equipment, to a base station, a report of the power measurement information determined based on the received downlink reference signal,
wherein based on the reporting of the power measurement information being configured for Layer 1 reference signal received power (L1-RSRP) reporting:
a minimum required time for reporting of the power measurement information is determined based on (i) a first timing parameter related to a first time duration from a last timing of the downlink reference signal to a transmission timing of the report of the power measurement information and (ii) a second timing parameter related to a second time duration from a timing of a triggering DCI to a timing of the downlink reference signal,
wherein the minimum required time for reporting of the power measurement information is determined based on the first timing parameter and the second timing parameter such that, for a subcarrier spacing of 60 kHz and 120 kHz:
for the second timing parameter having a value of 14: the minimum required time for reporting of the power measurement information is calculated as a sum of (i) the first timing parameter and (ii) the second timing parameter, and
for the second timing parameter having a value of 224 and 336: the minimum required time for the reporting of the power measurement information is determined based on a specific value.

2. The method of claim 1, wherein the second timing parameter is related to a duration of time to switch to a reception beam of the downlink reference signal.

3. The method of claim 1, wherein the downlink reference signal is at least one of a channel state information-reference signal (CSI-RS) or a synchronization signal block.

4. The method of claim 1, wherein the downlink reference signal is configured to be an aperiodic reference signal.

5. The method of claim 1, wherein based on the reporting of the power measurement information being configured for the L1-RSRP reporting:
for the first timing parameter, the transmission timing of the report of the power measurement information corresponds to a starting symbol of a Physical Uplink Shared Channel (PUSCH) containing the report.

6. The method of claim 1, further comprising:
reporting, to the base station, information regarding the second timing parameter as UE capability information,
wherein the second timing parameter indicates a UE capability for a minimum required time between the timing of the triggering DCI and the timing of the downlink reference signal.

7. The method of claim 1, wherein based on the reporting of the power measurement information being configured for the L1-RSRP reporting:
the L1-RSRP reporting is one of (i) a CSI-RS resource indicator (CRI) and RSRP (CRI-RSRP) reporting, or (ii) a synchronization signal block (SSB) identifier and RSRP (SSB-Index-RSRP) reporting.

8. The method of claim 1, wherein based on the reporting of the power measurement information being configured for the L1-RSRP reporting, the method further comprises:
calculating a L1-RSRP value based on the received downlink reference signal; and
including the L1-RSRP value as part of the report that is transmitted to the base station.

9. The method of claim 1, wherein the minimum required time for reporting of the power measurement information is determined based on an upper bound threshold criterion which depends on the second timing parameter,
wherein the upper bound threshold criterion is not exceeded for the second timing parameter having the value of 14, so that the minimum required time for reporting of the power measurement information is calculated as the sum of (i) the first timing parameter and (ii) the second timing parameter, and
wherein the upper bound threshold criterion is exceeded for the second timing parameter having the value of 224 and 336, so that the minimum required time for the reporting of the power measurement information is determined based on a specific value.

10. A user equipment (UE) configured to transmit power measurement information related to beam reporting in a wireless communication system, the UE comprising:
at least one transceiver;
at least one processor; and
at least one computer memory is connected to the at least one processor and storing instructions that, based on being executed by the at least one processor, perform operations comprising:
receiving, through the at least one transceiver, downlink control information (DCI) that triggers reporting of the power measurement information;
receiving, through the at least one transceiver, a downlink reference signal for reporting of the power measurement information; and
transmitting, to a base station through the at least one transceiver, a report of the power measurement information determined based on the received downlink reference signal,
wherein based on the reporting of the power measurement information being configured for Layer 1 reference signal received power (L1-RSRP) reporting:
a minimum required time for reporting of the power measurement information is determined based on (i) a first timing parameter related to a first time duration from a last timing of the downlink reference signal to a transmission timing of the report of the power measurement information and (ii) a second timing parameter related to a second time duration from a timing of a triggering DCI to a timing of the downlink reference signal,
wherein the minimum required time for reporting of the power measurement information is determined based on the first timing parameter and the second timing parameter such that, for a subcarrier spacing of 60 kHz and 120 kHz:
for the second timing parameter having a value of 14: the minimum required time for reporting of the power measurement information is calculated as a sum of (i) the first timing parameter and (ii) the second timing parameter, and
for the second timing parameter having a value of 224 and 336: the minimum required time for the reporting of the power measurement information is determined based on a specific value.

11. The UE of claim 10, wherein the second timing parameter is related to a duration of time to switch to a reception beam of the downlink reference signal.

12. The UE of claim 10, wherein the downlink reference signal is at least one of a channel state information-reference signal (CSI-RS) or a synchronization signal block.

13. The UE of claim 10, wherein the downlink reference signal is configured to be an aperiodic reference signal.

14. The UE of claim 10, wherein based on the reporting of the power measurement information being configured for the L1-RSRP reporting:
for the first timing parameter, the transmission timing of the report of the power measurement information corresponds to a starting symbol of a Physical Uplink Shared Channel (PUSCH) containing the report.

15. The UE of claim 10, wherein the operations further comprise:
reporting, to the base station, information regarding the second timing parameter as UE capability information,
wherein the second timing parameter indicates a UE capability for a minimum required time between the timing of the triggering DCI and the timing of the downlink reference signal.

16. The UE of claim 10, wherein based on the reporting of the power measurement information being configured for the L1-RSRP reporting:
the L1-RSRP reporting is one of (i) a CSI-RS resource indicator (CRI) and RSRP (CRI-RSRP) reporting, or (ii) a synchronization signal block (SSB) identifier and RSRP (SSB-Index-RSRP) reporting.

17. The UE of claim 10, wherein based on the reporting of the power measurement information being configured for the L1-RSRP reporting, the operations further comprise:
calculating a L1-RSRP value based on the received downlink reference signal; and
including the L1-RSRP value as part of the report that is transmitted to the base station.

18. The UE of claim 10, wherein the minimum required time for reporting of the power measurement information is determined based on an upper bound threshold criterion which depends on the second timing parameter,
wherein the upper bound threshold criterion is not exceeded for the second timing parameter having the value of 14, so that the minimum required time for reporting of the power measurement information is calculated as the sum of (i) the first timing parameter and (ii) the second timing parameter, and
wherein the upper bound threshold criterion is exceeded for the second timing parameter having the value of 224 and 336, so that the minimum required time for the reporting of the power measurement information is determined based on a specific value.

19. A processing apparatus configured to control a user equipment (UE) to transmit power measurement information related to beam reporting in a wireless communication system, the processing apparatus comprising:
at least one processor; and
at least one memory operably is connected to the at least one processor and storing instructions that, based on being executed by the at least one processor, perform operations comprising:
receiving, by the user equipment, downlink control information (DCI) that triggers reporting of the power measurement information;

receiving, by the user equipment, a downlink reference signal for reporting of the power measurement information; and transmitting, by the user equipment, to a base station, a report of the power measurement information determined based on the received downlink reference signal, wherein based on the reporting of the power measurement information being configured for Layer 1 reference signal received power (L1-RSRP) reporting:

a minimum required time for reporting of the power measurement information is determined based on (i) a first timing parameter related to a first time duration from a last timing of the downlink reference signal to a transmission timing of the report of the power measurement information and (ii) a second timing parameter related to a second time duration from a timing of a triggering DCI to a timing of the downlink reference signal, wherein the minimum required time for reporting of the power measurement information is determined based on the first timing parameter and the second timing parameter such that, for a subcarrier spacing of 60 kHz and 120 kHz:

for the second timing parameter having a value of 14: the minimum required time for reporting of the power measurement information is calculated as a sum of (i) the first timing parameter and (ii) the second timing parameter, and for the second timing parameter having a value of 224 and 336: the minimum required time for the reporting of the power measurement information is determined based on a specific value.

20. At least one non-transitory computer-readable media storing instructions that, based on being executed by at least one processor, perform operations comprising:

receiving, from a base station, downlink control information (DCI) that triggers reporting of power measurement information;

receiving, from the base station, a downlink reference signal for reporting of the power measurement information; and transmitting, to the base station, a report of the power measurement information determined based on the received downlink reference signal, wherein based on the reporting of the power measurement information being configured for Layer 1 reference signal received power (L1-RSRP) reporting:

a minimum required time for reporting of the power measurement information is determined based on (i) a first timing parameter related to a first time duration from a last timing of the downlink reference signal to a transmission timing of the report of the power measurement information and (ii) a second timing parameter related to a second time duration from a timing of a triggering DCI to a timing of the downlink reference signal, wherein the minimum required time for reporting of the power measurement information is determined based on the first timing parameter and the second timing parameter such that, for a subcarrier spacing of 60 kHz and 120 kHz:

for the second timing parameter having a value of 14: the minimum required time for reporting of the power measurement information is calculated as a sum of (i) the first timing parameter and (ii) the second timing parameter, and for the second timing parameter having a value of 224 and 336: the minimum required time for the reporting of the power measurement information is determined based on a specific value.

\* \* \* \* \*